US010637951B2

(12) United States Patent
Siegel et al.

(10) Patent No.: US 10,637,951 B2
(45) Date of Patent: Apr. 28, 2020

(54) SYSTEMS AND METHODS FOR MANAGING DATA PROXIES

(71) Applicant: Massachusetts Institute of Technology, Cambridge, MA (US)

(72) Inventors: Joshua E. Siegel, Bloomfield Hills, MI (US); Sanjay E. Sarma, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 433 days.

(21) Appl. No.: 15/483,768

(22) Filed: Apr. 10, 2017

(65) Prior Publication Data

US 2017/0295253 A1 Oct. 12, 2017

Related U.S. Application Data

(60) Provisional application No. 62/319,845, filed on Apr. 8, 2016.

(51) Int. Cl.
*H04L 29/08* (2006.01)
*H04L 12/26* (2006.01)
(Continued)

(52) U.S. Cl.
CPC ........ *H04L 67/2819* (2013.01); *H04L 41/145* (2013.01); *H04L 41/5012* (2013.01);
(Continued)

(58) Field of Classification Search
CPC ... H04L 67/12; H04L 67/2819; H04L 41/145; H04L 41/5009; H04L 41/5029;
(Continued)

(56) References Cited

U.S. PATENT DOCUMENTS 9,560,060 B2 * 1/2017 Baxley ............... H04L 63/1416
9,721,210 B1 * 8/2017 Brown .................. G06N 20/00
(Continued)

FOREIGN PATENT DOCUMENTS

WO WO-2016137848 A1 * 9/2016 ............... G06N 5/04

OTHER PUBLICATIONS

Adlakha S., et al., ""Optimal sensing rate for estimation over shared Communication links,"" in American Control Conference, 2007. ACC'07. IEEE, 2007, pp. 5043-5045.
(Continued)

*Primary Examiner* — Kostas J Katsikis
(74) *Attorney, Agent, or Firm* — Nutter McClennen & Fish LLP

(57) ABSTRACT

Systems and methods are provided for managing data proxies. The systems and methods enable a proxy management system to store and manage data proxies that digitally represent real-world objects equipped with sensors. The data proxy of an object is made up of data sampled by the object's sensors and data estimated using the sampled data. The sampling rate at which the data is sampled can be optimized such that it conforms with target quality of data (QoD) requirements and/or target data acquisition costs. The QoD requirements can be based on requirements set by each of the applications associated with an object. The proxy management system can use the sampled data and estimated data to (1) ensure that incoming messages, if executed, would not have negative consequences; and (2) monitor objects to determine if and when they are expected to approach undesirable states, or if they have already reached such undesirable states.

33 Claims, 12 Drawing Sheets

(51) Int. Cl.
  *H04L 12/24* (2006.01)
  *H04W 4/02* (2018.01)
  *H04L 29/06* (2006.01)
(52) U.S. Cl.
  CPC ........ *H04L 41/5029* (2013.01); *H04L 43/024* (2013.01); *H04L 43/0823* (2013.01); *H04L 43/0888* (2013.01); *H04L 63/08* (2013.01); *H04W 4/025* (2013.01); *H04L 67/12* (2013.01)
(58) Field of Classification Search
  CPC ............... H04L 41/5012; H04L 43/024; H04L 43/0823; H04L 43/0888; H04L 63/08; H04W 4/025
  See application file for complete search history.

(56) References Cited

U.S. PATENT DOCUMENTS

| | | | | |
|---|---|---|---|---|
| 9,955,318 | B1* | 4/2018 | Scheper | G06Q 30/0281 |
| 10,022,614 | B1* | 7/2018 | Tran | B33Y 10/00 |
| 10,176,435 | B1* | 1/2019 | Sarkar | G06N 20/00 |
| 10,503,795 | B2* | 12/2019 | Papageorgiou | G06F 16/285 |
| 2015/0113592 | A1* | 4/2015 | Curtis | H04L 63/0823 726/2 |
| 2015/0134801 | A1* | 5/2015 | Walley | H04L 43/50 709/223 |
| 2015/0134954 | A1* | 5/2015 | Walley | H04L 63/08 713/168 |
| 2015/0350914 | A1* | 12/2015 | Baxley | H04W 12/08 726/11 |
| 2016/0127931 | A1* | 5/2016 | Baxley | G06F 16/285 455/67.16 |
| 2016/0187961 | A1* | 6/2016 | Elibol | G06F 1/3293 713/323 |
| 2016/0196527 | A1* | 7/2016 | Bose | G06Q 10/0832 705/332 |
| 2016/0247129 | A1* | 8/2016 | Song | G06Q 10/20 |
| 2016/0335534 | A1* | 11/2016 | Nere | G06N 3/0445 |
| 2017/0006135 | A1* | 1/2017 | Siebel | G06F 9/5072 |
| 2017/0033899 | A1* | 2/2017 | Rakib | H04L 5/0007 |
| 2017/0093700 | A1* | 3/2017 | Gilley | H04L 45/44 |
| 2017/0099353 | A1* | 4/2017 | Arora | H04L 67/12 |
| 2017/0103167 | A1* | 4/2017 | Shah | G06F 11/1464 |
| 2017/0208151 | A1* | 7/2017 | Gil | G06F 21/57 |
| 2017/0232300 | A1* | 8/2017 | Tran | H04L 67/12 434/247 |
| 2017/0234709 | A1* | 8/2017 | Mackie | G01F 1/60 73/861.08 |
| 2017/0238072 | A1* | 8/2017 | Mackie | G01F 1/60 340/870.03 |
| 2017/0295253 | A1* | 10/2017 | Siegel | H04L 41/145 |
| 2017/0315541 | A1* | 11/2017 | Kreidler | G05B 19/4185 |
| 2018/0000344 | A1* | 1/2018 | Melodia | A61B 5/0026 |
| 2018/0078843 | A1* | 3/2018 | Tran | G16H 40/63 |
| 2018/0204111 | A1* | 7/2018 | Zadeh | G06N 3/0436 |
| 2018/0248973 | A1* | 8/2018 | Cook | H04L 67/306 |
| 2018/0307859 | A1* | 10/2018 | LaFever | H04L 63/0407 |
| 2018/0332434 | A1* | 11/2018 | Kulkarni | H04L 67/22 |
| 2019/0014615 | A1* | 1/2019 | Wang | H04L 12/1872 |
| 2019/0335551 | A1* | 10/2019 | Williams | H05B 33/08 |

OTHER PUBLICATIONS

Das, A., et al., "Sensor selection for minimizing worst-case prediction error," in Information Processing in Sensor Networks, 2008. IPSN '08. International Conference on Information Processing in Sensor Networks, IEEE, 2008, pp. 97-108.

Gubbi, J., et al., "Internet of things (iota): A vision, architectural elements, and future directions," Future Generation Computer Systems, 2013, v. 29, No. 7, pp. 1645-1660.

Guinard, D., et al., "From the internet of things to the web of things: Resource-oriented architecture and best practices," in Architecting the Internet of Things. Springer, 2011, pp. 97-129.

Hu, L, et al., ""Optimization of the deployment of temperature nodes based on linear programing in the internet of things,"" Tsinghua Science and Technology, vol. 18, No. 3, pp. 250-258, 2013.

Hu X. et al., "Estimation of state of charge of a lithium-ion battery pack for electric vehicles using an adaptive lionburger observer," Energies 3, 1586-1603 (2010).

Jain, A., et al., "Adaptive sampling for sensor networks." in Proceedings of the 1st international workshop on Data management for sensor networks: in conjunction with VLDB 2004. ACM, 2004, pp. 10-16.

Jain, A., et al., ""Adaptive stream resource management using kalman filters,"" in Proceedings of the 2004 ACM SIGMOD international conference on Management of data. ACM, 2004, pp. 11-22.

Kalman, R. E., "A new approach to linear filtering and prediction problems," Journal of Basic Engineering, vol. 82, No. 1, pp. 35-45, 1960.

Kumar, S., et al., ""Integrating On-board Diagnostics Speed Data with Sparse GPS Measurements for Vehicle Trajectory Estimation,"" SICE Annual Conference, Sep. 2013; pp. 2302-2308.

Landau, I. et al., Adaptive control. Springer Berlin, 1998, vol. 51; chapter 1, pp. 1-33.

Li, F., et al., "Efficient and scalable iota service delivery on cloud," 2013, IEEE Sixth International Conference on Cloud Computing (CLOUD), . IEEE, 2013, pp. 740-747.

Li, S., et al., "Compressed sensing signal and data acquisition in wireless sensor networks and internet of things," Industrial Informatics, IEEE Transactions on Industrial Informatics, vol. 9, No. 4, pp. 2177-2186, 2013.

Lightner, B. D., "AVR-based fuel consumption gauge," Circuitcellular, 2005, pp. 59-67. [Online]. Available: <www.lightner.net/lightner/bruce/Lightner-183.pdf>.

Liu, X., et al., "Optimal real-time sampling rate assignment for wireless sensor networks," ACM Trans. Sen. Netw., vol. 2, No. 2, pp. 263-295, 5 2006. [Online]. Available: <http://doi.acm.org/10.1145/1149283.1149288.

Luenberger, D. G., "Observers for multivariable systems," IEEE Transactions on Automatic Control vol. 11, No. 2, pp. 190-197, 1966.

Marsan,C. D., "IAB releases guidelines for internet-of-things developers," IETF Journal, vol. 11, No. 1, pp. 6-8, 7 2015.

Oehlerking, A. L., "Streetsmart: modeling vehicle fuel consumption with mobile phone sensor data through a participatory sensing framework," Master's thesis, Massachusetts Institute of Technology, 2011; pp. 1-109.

Powell, J. D., et al., "Observer-based air fuel ratio control," IEEE Control Systems, vol. 18, No. 5, pp. 72-83, 1998.

Ratnasamy, S., et al., "Data-centric storage in sensornets," Submitted to SIGCOMM, Feb. 1, 2002. pp. 1-14.

Shrobe, H., et al., ""AWDRAT: A Cognitive Middleware System for Information Survivability,"" IAAI'06 Proceedings of the 18th conference on Innovative applications of artificial intelligence, 2006, vol. 2, pp. 1836-1843.

Shu, W., et al., "Optimal sampling rate assignment with dynamic route selection for real-time wireless sensor networks ," in Real-Time Systems Symposium, 2008. IEEE, pp. 431-441.

Siegel, J. "Data proxies, the cognitive layer, and application locality: enablers of cloud-connected vehicles and next-generation internet of things," Doctoral Dissertation, Massachusetts Institute of Technology (Jun. 2016).

Siegel, J. et al., "Cloud, Context, and Cognition: Paving the Way for Efficient and Secure IoT Implementations," submitted for potential publication as CPS Cognitive IoT book chapter; publication pending, 2018.

Siegel, J., et al., "Vehicular engine oil service life characterization using on-board diagnostic (OBD) sensor data," in SENSORS,IEEE, 2014, pp. 1722-1725.

Siegel, J. E., "Cloudthink and the avacar: embedded design to create virtual vehicles for cloud-based informatics, telematics, and infotainment," Master's thesis, Massachusetts Institute of Technology, Jun. 2013. 111 pages.

(56) References Cited

OTHER PUBLICATIONS

Siegel, J. E et al., "Smartphone-based vehicular tire pressure and condition monitoring," in Proceedings of SAI Intelligent Systems Conference (IntelliSys) 2016, pp. 805-824 (Springer Intl Publishing AG).

Siegel, J. E., et al., "The Future Internet of Things: Secure, Efficient, and Model-Based," IEEE Internet of Things Journal, v. 27, No. 7, Mar. 2017.

Wilhelm, E., et al.,"Cloudthink: a scalable secure platform for mirroring transportation systems in the cloud," Transport, vol. 30, No. 3, pp. 320-329, 2015.

Wu, Q., et al., "Cognitive internet of things: a new paradigm beyond connection," IEEE Internet of Things Journal, vol. 1, No. 2, pp. 129-143 (2014).

* cited by examiner

SYSTEMS AND METHODS FOR MANAGING DATA PROXIES

CROSS REFERENCE TO RELATED APPLICATION

The present application claims priority to and the benefit of U.S. Provisional Application No. 62/319,845 filed on Apr. 8, 2016, and titled "Application of Data Proxies and Cognitive Firewalls to a Secure and Resource-Efficient Implementation for Connected Systems," the content of which is incorporated herein by reference in its entirety.

FIELD

The present application relates to systems and methods for managing data proxies, and more specifically to managing data proxies that digitally represent objects.

BACKGROUND

The internet of things (IoT) refers to a system or infrastructure made up of interconnected people, devices, structures, vehicles, and services, which can be referred to as "objects" or "things" in the context of the IoT. There is a plethora of objects that are and can be interconnected, and can include, for example, heart monitoring implants, biochip transponders on people or animals, automobiles with built-in sensors, DNA analysis devices, and surgical tools. The number of these objects in the IoT is rapidly growing and is expected to expand to over fifty billion by the year 2020. The size and growth of the IoT enables the creation of products, technologies and applications such as connected and smart cars, homes, factories, wearable devices, and infrastructure, grids, transportation, and cities, which can result in improved efficiency, accuracy and usability, and reduced costs.

There are many challenges, however, resulting from the size and rapid growth of the IoT, including problems relating to resource efficiency, data privacy and system security. For example, it is estimated that by the year 2025, objects in the IoT will generate over two zettabytes of data. The amount of growing data is driven by, among other things, the desire to share information and generate richer data. This results in challenges related to battery, bandwidth, bytes, and computation. Battery challenges include device and system power consumption; bandwidth challenges include issues related to the amount of data that is transmitted or routed; byte challenges include issues related to the amount of data required to be stored; and computation challenges includes issues related to the amount of processing that is thereby expended on, among other things, high-powered computation needed to drive security-related resources.

At the same time, the high-value of the interconnected objects and their data makes the IoT a desirable attack surface. Security vulnerabilities are especially critical when dealing with interconnected objects in sensitive locations that have access to potentially harmful actuation capabilities. Existing approaches to deal with privacy and security challenges, however, are insufficient. And, in many instances, manufacturers and service providers have little to no built-in protection. One such approach, for example, "security through obscurity," attempts to rely on secrecy rather than proactively addressing these challenges. Moreover, in an effort to meet strict cost targets, developers and providers avoid or minimize proper authentication, encryption and message integrity checks due to the computational overhead (e.g., processors with higher memory and speed) required for cryptography.

Conventional connectivity architectures fail to adequately address the above challenges. Indeed, direct connectivity and hub connectivity topologies suffer from additional shortcomings relating to, for example, service management, rule creation, scalability, and incentivizing data sharing. Direct connectivity is an architecture in which applications engage directly with objects and their sensors. While such an approach is useful for connecting a few objects, it fails to efficiently and effectively scale to handle each additional applications' request. If an application samples an object at n Hz and m copies of that application are running, the objects are queried at m*n times per second. This results in consuming additional bandwidth and power, possibly saturating networks, to convey similar information. Because these objects are often low-cost and resource-limited, they are incapable of running appropriate credentialing, encryption and other security services. In hub connectivity, objects and applications communicate through a master node (e.g., hub) capable of translating and moderating the flow of information. Typically, these hubs have limited sampling intelligence to locally aggregate and pre-process sampled data, resulting in limited or subpar reduction of data collection and transmission. In other words, hub connectivity is designed to address small to medium networks, such as those in which application payloads are known and aggregation and pre-processing computation can be reduced.

In light of the above challenges, algorithms have been designed to optimize routing, minimize power, and increase the efficiency of computation for networks, such as networks of interconnected objects and sensors (e.g., IoT). These approaches and algorithms include those designed, for example, to centrically store data to minimize search energy and bandwidth expenditure; minimize sampling rates to reduce bandwidth and power expenditures; predict intermediate sensor data, and reduce number of sensors and sampling rate to minimize energy requirements; use filters to meet error targets to minimize bandwidth; reconstruct signals from sparse samples at end nodes; and deploy only critical sensors to reduce energy or bandwidth requirements. However, these approaches optimize single elements of a system while compromising other aspects—i.e., trading one challenge for another, such as trading bandwidth for computation.

Accordingly, there is a need for systems and methods for managing interconnected objects and applications in a manner that optimizes resource use, security, and privacy, while meeting data quality and timeliness targets. There is a need for such systems and methods to be scalable, and deployable in various networking architectures, including cloud computing and the IoT.

SUMMARY

The present disclosure generally provides for systems and methods for managing data proxies. Data proxies are digital representations of connected objects (or real-world "things" in an Internet of Things (IoT) computing environment) such as systems, devices, people, structures, and the like that are stored in and managed by a proxy management system. The proxy management system can be implemented in various ways, including a cloud-computing architecture in which applications can communicate with data proxies rather than the objects that they represent. The data proxies are made up of (1) data sampled from sensors of the connected objects, and (2) data that are estimated based on the sampled data. In order to reduce resource costs (e.g., bandwidth, battery, storage) incurred from sampling data from the sensors of the objects, the proxy management system dynamically calculates sampling rates at which the sensors of each of the objects is to be sampled, such that optimal sampling rates can be identified. Optimal sampling rates are calculated to meet or approximate as nearly as possible, (1) quality of data (QoD) requirements relating, for example, to the accuracy and timeliness of the sampled data; and (2) target resource costs for acquiring the data. In this way, high-quality data can be obtained at a sampling rate that minimizes resource costs. The proxy management system can also process incoming and outgoing messages. Using an object's sampled data and estimated data, the proxy management system can check whether incoming messages, if processed, would potentially negatively impact the object. Likewise, using the object's sampled data and estimated data, the proxy management system can monitor whether an object is approaching or then-experiencing an undesirable state relative to the object's rules and limits. If so, the proxy management system can take appropriate action.

In one exemplary embodiment of a system for managing data proxies, the system includes at least one memory and at least one processor communicatively coupled to the at least one memory. The at least one memory is operable to store one or more data proxies that digitally represent, respectively, one or more objects. Each of the one or more objects (1) includes one or more sensors operable to sample data, and (2) is generated based on a respective model of the one or more objects. Each of the models includes one or more data acquisition costs associated with each of the one or more sensors. First sampled data is received from the one or more sensors of a first object among the one or more objects. The first sampled data is sampled by the one or more sensors at respective first sampling rates. A first data proxy is populated based on the first sampled data, and at least one data set is simulated based on one or more of (i) at least a portion of the first sampled data of the first data proxy, and (ii) supplemental data. The first data proxy is further populated based on the at least one simulated data set. Simulating of the one or more data sets can include a forward-simulation.

The supplemental data can include sampled or simulated data from reference objects. The first sampling rates can be fully-sampled sampling rates that indicate a maximum rate at which each of the one or more sensors of the first object can be sampled.

In some embodiments, the first object is associated with one or more applications. A quality of data (QoD) target metric is received from each of the one or more applications. An aggregate QoD target metric is calculated based on the QoD target metrics received from each of the one or more applications, and second sampling rates are calculated for each the one or more sensors of the first object. Second sampled data is received from the one or more sensors of the first object, the second sampled data being sampled by the one or more sensors of the first object at the respective second sampling rates. First object data is estimated based on the second sampled data. The first data proxy is populated based on the second sampled data and the estimated first object data. Further, in some embodiments, a QoD metric of the combination of the second sampled data and the estimated first object data meets or exceeds the aggregate QoD target metric Each of the at least one simulated data sets can be simulated at candidate sampling rates. Second sampling rates can be determined for each of the one or more sensors, the second sampling rates being selected from among the candidate sampling rates. Second sampled data can be received from the one or more sensors of the first object, the second sampled data being sampled by the one or more sensors of the first object at the respective second sampling rates. The first data proxy can be populated based on the second sampled data In some embodiments, the first object is associated with one or more applications. A quality of data (QoD) target metric can be received from each of the one or more applications. An aggregate QoD target metric can be calculated based on the QoD target metrics received from each of the one or more applications; and a QoD metric can be calculated for each of the one or more simulated data sets. The second sampling rates can be determined based on a comparison of (i) the QoD metric for at least one of the simulated data sets, and (ii) the aggregate QoD target metric The first sampled data can be fully sampled data, and the second sampled data can partially sampled data. First object data can be estimated based on the second sampled data, the estimated first object data corresponding to gaps among the second sampled data. The first sampling rates, the candidate sampling rates, and the second sampling rates can be measured in a uniform or non-uniform number of samples per cycle.

In some embodiments, to receive the first and second sampled data, the one or more sensors of the first object are caused to collect the first sampled data and the second sampled data.

In some embodiments, a total acquisition cost is calculated for acquiring each of the simulated data sets, the total acquisition cost being based on the data acquisition cost associated with each of the one or more sensors. Determining of the second sampling rates is further based on the total acquisition cost for acquiring each of the at least one simulated data sets.

In some embodiments, the second sampling rates are selected from the candidate sampling rates corresponding to one of the simulated data sets having (i) a QoD metric that meets or exceeds the aggregate QoD target metric, and (ii) has a lowest total acquisition cost thereamong. And, in some embodiments, the second sampling rates are selected from the candidate sampling rates corresponding to one of the simulated data sets having (i) a total acquisition cost that is lower than or equal to a target acquisition cost, and (ii) a QoD metric closest to the aggregate QoD target metric. The value of the aggregate QoD target metric can be the value of a highest QoD among the QoD target metrics of the one or more applications. Moreover, in some embodiments, the simulating of the at least one data set is further based on system constraints which can define maximum and minimum operational limits of or associated with the first object or the one or more sensors of a first object.

The QoD target metric of each of the one or more applications, the aggregate QoD target metric, and the QoD for each of the simulated data sets can be based on one or more accuracy and timeliness requirements. The accuracy and timeliness requirements can comprise maximum and minimum errors allowed at a particular time, maximum and minimum errors allowed during regular intervals, maximum and minimum sum of errors allowed between target times, and maximum and minimum time allowed since last sampling.

In some embodiments, a first message is received from a first application communicatively coupled to the first object.

The first message is validated and one of the data sets is simulated further based on the first message.

In some embodiments, the first message comprises authentication information, and the validating the first message is based at least in part on the authentication information.

In some embodiments, one or more potential negative impacts on the first object are identified based on (i) the data set simulated based on the first message, and (ii) system limits associated with the first object.

The first message can be a command. The command in the first message can be executed if one or more potential negative impacts on the first object are not identified, the one or more potential negative impacts being identified based on (i) the data set simulated based on the first message, and (ii) system limits associated with the first object. The first message can also be a request comprising information indicating requested data and a requested QoD metric including one or more accuracy and timeliness requirements. A response can to the request can be transmitted to the first application including the requested data.

In some embodiments, the response includes a response QoD metric including one or more accuracy and timeliness requirements corresponding to the requested data in the response. And, in some embodiments, the response QoD metric includes a confidence interval indicating one or more differences between the requested data in the request and the requested data in the response. In some embodiments, the one or more differences include a comparison of the requested QoD metric and the response QoD metric.

In some embodiments, the first sampled data is sampled at a first time instance. The simulated data sets include estimated first object information estimated based on the first sampled data sampled at the first time instance. Second sampled data corresponding to a second time instance is received, and the second sampled data is compared to the estimated first object information. One or more errors are identified based on the comparing of the second sampled data to the estimated first object information. In some embodiments, it is determined if the one or more errors are errors in the first object or in the second sampled data.

In one exemplary embodiment of a method for managing data proxies, first data related to the operation of one or more objects is received and, based on the first data, a first data proxy corresponding to a first object is populated. The first object can be interconnected among one or more objects, each of which can comprise one or more sensors. The first data proxy can be a digital representation of the first object. The first data can comprise one or more of (i) sampled data, (ii) estimated data, and (iii) historic data.

In some embodiments, the first data comprise first sampled data sampled at first sampling rates by the one or more sensors of the first object during a first time period. First estimated data, which can relate to a time period prior to, during, or after the first time period, can be generated based at least on the first sampled data, the first estimated data. The first data proxy can be populated further based on the first estimated data.

In some embodiments, the first sampling rate is a uniform or non-uniform sampling rate that causes the first sampled data to be sampled at intermittent time instances during the first time period, such that non-sampled gaps are created at time periods between the intermittent time instances. The first estimated data can relate to at least the first time period and corresponds to the non-sampled gaps at the time periods between the intermittent time instances. Populating of the first data proxy can be based on the first sampled data and the first estimated data causes the non-sampled gaps during the first time period to be at least partially populated.

In some embodiments, one or more of a target QoD metric and/or a target data acquisition cost are identified. One or more estimated data sets are generated at respective candidate sampling rates, the candidate sampling rates being downsampled sampling rates relative to the first sampling rate. An optimized sampling rate is selected from among the candidate sampling rates based on one or more of the QoD and/or total cost of the estimated data set corresponding to the selected sampling rate.

The selected optimized sampling rate can be the sampling rate that correspond to the estimated data set having (i) a lowest total cost among the one or more estimated data sets having a QoD metric matching or exceeding the target QoD metric, or (ii) a highest QoD among the one or more estimated data sets having a total cost equal to or lower than the target data acquisition cost.

In some embodiments, a first request including first request data can be received from one of a plurality of applications. One or more estimated data sets are generated based on the first sampled data and the first request, and it is determined if the one or more estimated data sets violate any of a first set of rules. The request is processed according to the determination of the violation of any of the first set of rules. The one or more estimated data sets can be sampled at different sampling rates.

In some embodiments, the first sampled data is sampled at a first instance. One or more estimated data sets are generated based on the first sampled data sampled at a first time instance, the one or more estimated data sets including first object information for a second time instance. Second sampled data sampled at the second time instance is received and compared to the estimated first object information. One or more errors are identified based on the comparison of the second sampled data to the estimated first object information.

BRIEF DESCRIPTION OF DRAWINGS

The present application will be more fully understood from the following detailed description taken in conjunction with the accompanying drawings, in which.

DETAILED DESCRIPTION

Figure 1:
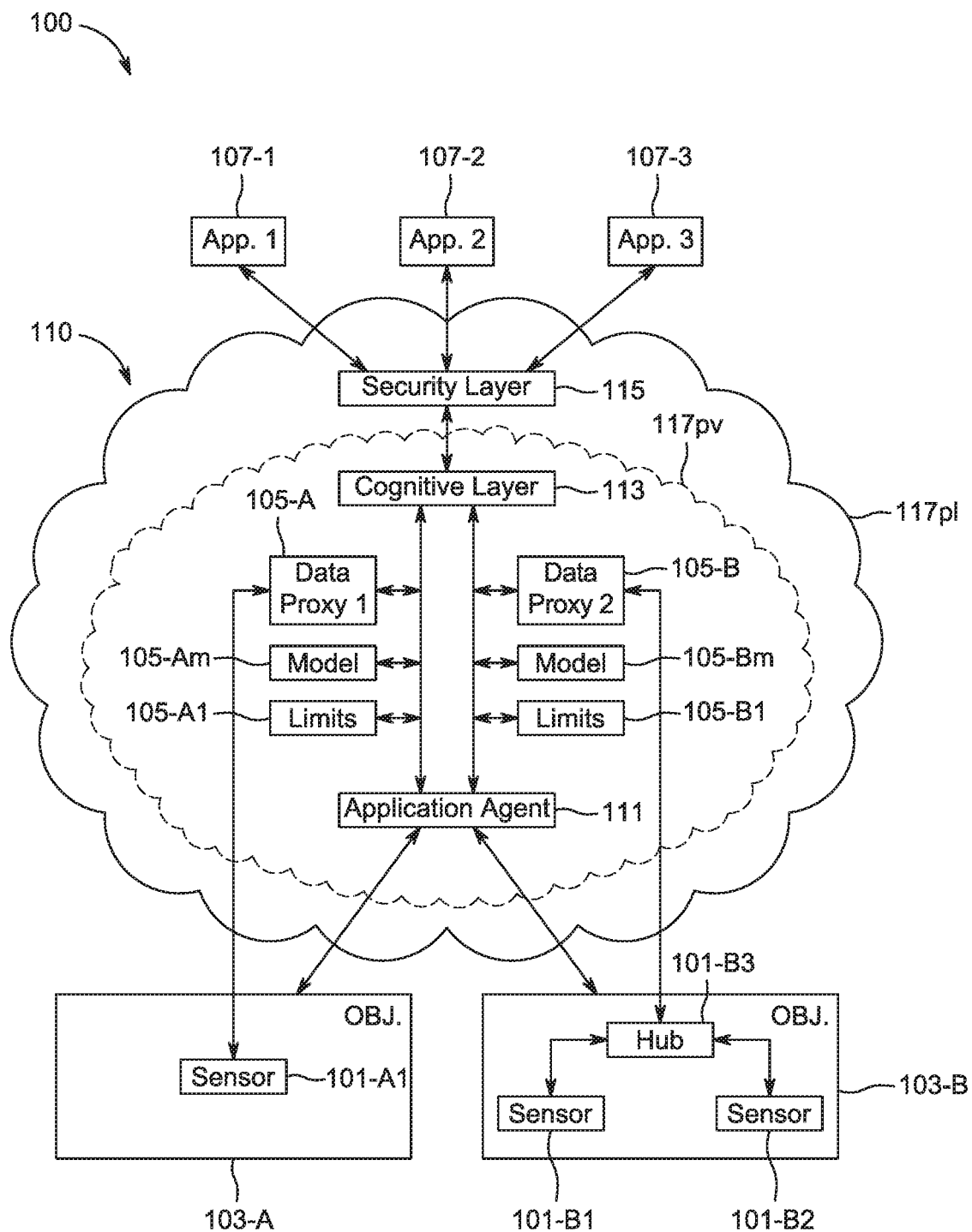
FIG. 1 is a diagram of one exemplary embodiment of a computing environment for managing data proxies.

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

Exemplary embodiments of the present disclosure provide for system and methods for managing data proxies. Data proxies are digital representations of objects that can be interconnected via cloud or enterprise computing architectures, including an Internet of Things (IoT) ecosystem. Objects refer to systems, devices, components, buildings, vehicles, and any physical "thing" that is equipped with or associated with one or more sensors that can measure or collect data. Data collected from sensors of objects are used to populate the objects' respective data proxies. While data proxies can be referred to as digital copies, mirrors, or duplicates of the objects and the data they create, it should be understood that data proxies can include or be made up of data that are not identical to the data produced by the objects. In other words, the data proxies are digital representations made up of intermittently sampled or sparse object data. The sampled data in the data proxies can be supplemented with estimated, simulated or otherwise approximated data using various techniques known to those of skill in the art, based on one or more of sampled data produced by the objects, or other relevant historic data that can indicate how the objects are expected to, should or have previously operated. To minimize resource costs, the objects can be sampled at optimized sampling rates that result in data proxies having data of high quality and/or data acquired at low resource costs, while still adequately digitally representing the object. The data proxies can be used to ensure that incoming messages, if executed, would not cause any negative results on the respective objects. The data proxies can also be used to verify that the object actually operates in the manner that is anticipated by the data proxy.

A person skilled in the art will recognize how to rely upon the present disclosure to implement the techniques, systems, devices, and methods described herein (1) in various computing environments such as those involving cloud computing, enterprise architectures and the Internet of Things, and (2) using any sensor-equipped objects such as physical devices, vehicles, buildings, people and other "things" interconnected via the IoT. A person skilled in the art will recognize that the disclosures provided for herein can also be applied to a local network (e.g., applying a cognitive firewall as provided for herein over a local network), and thus connecting to the Internet is not required even though reference is often made herein to the IoT.

First Embodiment

FIG. 1 illustrates one exemplary embodiment of a computing environment 100 for managing data proxies. As described in further detail below, the computing environment 100 is an ecosystem made up of objects, devices, systems or physical "things" that are interconnected over one or more networks, such as the Internet of Things (IoT). It should be understood that, hereinafter, the terms "objects," "devices," "systems," or "things" can be used interchangeably to refer to internetworked or interconnected components such as those forming part of the IoT. Some non-limiting examples of interconnected objects can include factories, vehicles, homes, machinery, devices (e.g., wearables), consumer products, infrastructure, and any other sensor-equipped or sensor-enabled physical object, as known by those of skill in the art.

As shown, the computing environment 100 includes a data proxy management system 110, which stores and manages data proxies 105-A and 105-B (collectively "105" or "data proxies 105") that digitally represent real-world objects 103-A and 103-B (collectively "103" or "objects 103"). Although not illustrated in FIG. 1, the proxy management system 110 includes one or more memory devices, processors, and communications means. As described in further detail below, the data proxies 105-A and 105-B include, among other things, (1) data sampled or collected via sensors of the objects 103-A and 103-B, respectively, and (2) estimated data derived (e.g., simulated) based on at least in part the sampled data. The proxy management system 110 leverages the data proxies 105-A and 105-B to, among other things, (1) evaluate and filter incoming commands from applications 107-1, 107-2, and 107-3 (collectively "107" or "applications 107"); (2) monitor the objects 103-A and 103-B; and (3) collect, store, manage, calculate and transmit data relating to the objects 103-A and 103-B, such as sampled data and data derived from sampled data. To do so, in some embodiments, the proxy management system 110 includes (in addition to the proxies 105-A and 105-B) and deploys one or more of an application agent 111, a cognitive layer 113 and a security layer 115. Each of these components is now described in further detail.

Objects

As shown in FIG. 1, the computing environment 100 includes an object 103-A and a system 103-B. The object 103-A and system 103-B are real-world physical objects that can collect and/or produce data, and that are connected to a cloud or similar computing environment. It should be understood that the objects 103 can be connected to and/or via networks known to those of skill in the art or can be non-networked, offline objects. As described in further detail below, the objects 103 can be digitally represented as and by data proxies.

The objects 103, which can also be referred to as "things" in the IoT, can be electronic or non-electronic. And, in some embodiments, one of the objects 103 can be a system of physically or communicatively coupled electronic or non-electronic objects. For instance, an individual object such as object 103-A can be a traditional electronic such as a wearable device or a washing machine, or an item that is not traditionally an electronic such as a surgical blade. On the other hand, 103-B represents an object in the form of a system, that can range from traditional electronics made up of multiple components, such as a computer or mobile device, to vehicles (e.g., car, plane), structures (e.g., buildings, houses), and other systems or groups of objects known by those of skill in the art.

An object in the form of a system, such as object 103-B, can be made up of objects that are traditionally not coupled (e.g., physically or logically) to one another but that can be associated to each other in or via the computing environment 100 to form a system. Such a system can be, for example, a vehicle that is made up of a car's electronics and other electronics such as a mobile device, wearable device or the like that are located within or otherwise associated with the vehicle.

In some embodiments, the objects 103 are equipped with one or more of electronics, software, sensors, actuators, controls and/or communications means that enable them, among other things, to collect (e.g., sample) and transmit information. The objects 103, and/or hardware attached thereto or associated therewith, can include one or more memory components, processors and/or communications means. Data sampled by an object is used to populated and maintain a corresponding data proxy. For instance, one way in which the objects 103 collect data is using corresponding sensors, which measure and/or collect information when they are operated or triggered. As known by those of skill in the art, sensors are electronic components or modules that can detect or measure information or attributes. The measured information or attributes relate to the objects to which the sensors are attached or with which they are associated. A non-exhaustive list of examples of sensors includes accelerometers, gyroscopic sensors, global position sensors, cameras, motion sensors, thermometers, etc., that can measure, for instance, light, temperature, speed, acceleration, location, etc.

As illustrated in FIG. 1, the object 103-A includes a sensor 101-A1. Object 103-B includes multiple sensors 101-B1 and 101-B2. In some embodiments, the object 103-A can be a device such as a wristband that is configured to produce and/or collect information from the single sensor 101-A1, such as a heart rate monitor. The object 103-B can be a vehicle made up of multiple sensors, or a vehicle's on board diagnostics (OBD) system that collects or measures information from multiple sensors 101-B1 and 101-B2, such as sensors to detect temperature, speed, emissions, and other information of or related to the vehicle.

The sensors forming or included in an object such as 103-B can be sensors equipped on separate objects that are associated with one another. For instance, the object 103-B can be a vehicle's OBD system that is made up of (1) sensors equipped on the vehicle's OBD system, together with (2) sensors equipped with a mobile device associated with the vehicle. The mobile device can be associated with the vehicle, for example, if it is owned by a vehicle operator, communicatively coupled with the vehicle, and/or positioned within the vehicle.

Sensors can be wired or wireless. Wireless sensors can communicate with other devices (e.g., sensors, systems, objects, etc.) using Wi-Fi, near field communication (NFC), Bluetooth and other short-range radio frequency means known by those of skill in the art. For example, the sensor 101-A1 can communicate directly with the proxy management system 110. Or, in some embodiments, the sensors can transmit and receive information to and from a central point of communication (e.g., hub, object) which in turn can exchange data with the proxy management system 110. For example, the sensors 101-B1 and 101-B2 can be communicatively coupled with the hub 101-B3, which can operate as a central point of communication to and from the sensors 101-B1 and 101-B2.

In addition or alternative to the sensors communicating directly with the proxy management system 110, the sensors can communicate with the objects 103 which can in turn communicate with the proxy management system 110. That is, the objects 103 can collect data from their sensors and transmit it to the proxy management system 110. The objects 103 can be coupled to the proxy management system 110 over different connections, in different manners (e.g., wired, wireless) and over different networks, as known by those of skill in the art.

In some embodiments, the objects 103 and/or their sensors can transmit data to the proxy management system 110 in order to satisfy requests for data from the applications 107, or can receive data such as commands originating from the applications 107.

Applications

The applications 107 can be computer programs, software and/or mobile apps installed and/or accessible via a computing device such as a personal computer, laptop, tablet, smartphone (not illustrated), server (not illustrated) and others known to those of skill in the art. The computing devices on which the applications 107 are installed and/or accessible each include at least a processor, a memory and wired or wireless communications means. The applications 107 can be paired, associated with or communicatively coupled with one or more of the objects 103 in order to, among other things, interact, control or communicate thereto or therewith. When paired or coupled, the applications 107 can transmit or receive communications to and from the paired objects 103 directly, and/or their corresponding digital representations—e.g., data proxies 105. Non-limiting examples of such communications include requests for data, commands, responses, and notifications.

Non-limiting examples of the applications 107 include streaming video applications, tracking applications, safety services applications, and map generating applications. It should be understood that any other applications know by those of skill in the art are contemplated herein.

Each of the applications 107 can have or be associated with one or more quality of data (QoD) metrics that indicate quality of data requirements for the data that is used to process or satisfy each of the applications' respective messages. Each of the applications 107 can be associated with multiple QoDs, such as one QoD per type of data, object, type of object and the like. In some embodiments, the QoD metric indicates a data set's timeliness and accuracy requirements. That is, an application can determine a target QoD based on specifying, for example, how recent and/or error-free (or likely error-free, or substantially error-free) the application requires or desires the data of the data set to be. The proxy management system 110 can calculate sampling rates or schemes at or with which to sample objects or sensors based on the indicated QoD metrics. Although in the illustrated embodiment multiple applications 107 are illustrated, in some embodiments just a single application may be part of the computing environment. Any number of applications is possible.

Proxy Management System

As discussed above, the object 103-A and system 103-B are digitally represented by corresponding data proxies 105-A and 105-B, respectively, which are stored and managed by the proxy management system 110. The proxy management system 110 includes hardware and software for managing the data proxies and communications thereto and therefrom. It should be understood that the proxy management system 110 can include any number of data proxies, including, in some embodiments, multiple data proxies for a single object. To manage the data proxies 105, the proxy management system 110 can include one or more of a security layer 115, a cognitive layer 113, and an application agent scheduler 111 deployed in a public and/or private cloud computing infrastructure.

In the illustrated embodiment, the proxy management system 110 includes a private cloud 117$pv$ and a public cloud 117$pl$. The private cloud 117$pv$ can be implemented within the public cloud 117$pl$, such that data or components (e.g., data proxies, software) within the private cloud 117$pv$ can be further secured relative to the data or components outside the private cloud 117$pv$ and within the public cloud 117$pl$. As discussed in further detail below, in some embodiments, the security layer 115 is implemented in the public cloud 117$pl$ while the data proxies 105-A and 105-B, the cognitive layer 113 and the application agent scheduler 115 are implemented in the private cloud 117$pv$.

Application Agent

As illustrated in FIG. 1, the application agent 111 of the proxy management system 110 is implemented within the private cloud 117$pv$. The application agent 111 can be a cloud-based and/or cloud-run manager, or can be edge-run or server-run. In some embodiments, the application agent is configured to aggregate quality of data (QoD) information from the applications 107. The application agent 111 can either request or pull the QoD information from each of the applications 107, or can receive the QoD information when pushed by the applications 107. As described in further detail below, each QoD represents an application's requested or required quality parameters for the data (e.g., sampled data and/or simulated data) that is used to satisfy the application's request.

As described in further detail below, the application agent 111 uses the aggregated QoDs to identify an optimal sampling scheme or sampling rate for each object to, among other things, optimize resource use and/or satisfy quality of data metrics. In some embodiments, the application agent 111 simulates data sets for an object based on data in the data proxy, including data sampled from the object or other objects, and/or historic data associated with any object. The application agent 111 can calculate a QoD corresponding to the simulated data. In some embodiments, the application agent 111 determines the QoD of the simulated data based on the QoD of the fully-sampled data. The fully-sampled data refers to data sampled from one or more sensors at a maximum rate, such as the sensors' maximum sampling rate. In some embodiments, the application agent 111 simulates downsampled data sets using decreasing sampling rates, and determines the QoD for each simulated downsampled data set. It should be understood that, in some embodiments, simulating at various sampling rates can be performed in any order, including a low rate to a maximum rate. Although described in further detail below, downsampling refers to a process in which a sampling rate is iteratively reduced to identify an optimal rate. Sampling rates lower than a fully-sampled rate can be referred to as "partially-sampled" sampling rates.

The application agent 111 can compare the QoD of each simulated downsampled data set to the QoD of the fully-sampled data. Based on this comparison, the application agent 111 can determine optimal sampling schemes and/or optimal sampling rates that enable the sampling of data that (1) meets target QoDs (e.g., applications' aggregate QoD), while (2) minimizing resource expenditure. As described in further detail below, minimizing resource expenditure can be achieved by, for example, calculating and analyzing the cost required to sample the data at various sampling rates used to calculate the optimal sampling rates. It should be understood that the cost required to acquire or sample data can also be referred to as "data acquisition cost."

In some embodiments, the application agent 111 includes a scheduler. The scheduler of the application agent 111 can be set to sample the sensors of the object at a desired sampling rate, such as a calculated optimal sampling rate. In some embodiments, sampling rates can be included as a part of a sampling scheme. A sampling scheme can indicate, among other things, the sampling rate of each of the sensors, how many and/or which sensors can be accessed simultaneously, sensor limits, and/or whether sensors are sampled uniformly (e.g., a constant and continuous pattern (e.g., sample every two seconds for one hour), or non-uniformly (e.g., sample every two seconds for twenty minutes, do not sample for one hour, sample every five seconds for half an hour).

As the computing environment 100 evolves, the application agent 111 can dynamically adjust or recalculate the sampling rate for each sensor or object. Using dynamic recalculation, the proxy management system 110 can ensure that criteria such as scalability and efficiency continue to be met even when applications 107 join or leave the system, when the applications' QoD requirements change, and/or when costs associated with objects' sensors change. In some embodiments, the triggering of dynamic recalculation of the sampling rate is event-based. For example, the event that triggers the recalculation of the sampling rate can be applications joining and leaving the computing environment 100. In other embodiments, the sampling rate is dynamically recalculated based on a schedule (e.g., at regular intervals), using machine learning to identify and anticipate changing requirements, and/or other automated and semi-automated techniques known to those of skill in the art. Dynamic recalculation of sampling rates is described in further detail below.

Security Layer

As shown in FIG. 1, the security layer 115 can be included within the public cloud 117$pl$. In some embodiments, messages such as requests and/or responses that are received by the proxy management system 110 from the applications 107, are processed through the security layer 115. In other words, the security layer 115 can operate as a moderator on behalf of the proxy management system 110 by, for example, establishing secure communication channels with clients such as applications 107, checking credentials of the applications 107 and/or their respective devices, and/or verifying the validity of the received messages.

By deploying the security layer 115 in the public cloud 117*pl* and moderating incoming connection requests, the security layer can protect the private cloud 117*pv* (including data and components therein) by ensuring that only authenticated messages, sent from trusted applications and/or via authenticated connections are allowed to pass through the public cloud 117*pl* and onto the private cloud 117*pv*. In this way, data and components in the private cloud 117*pv*, including the data proxies 105-A and 105-B, can be further secured.

Authentication messages, senders and communication channels between applications and the proxy management system 110 can be performed in various ways known to those of skill in the art. For example, in some embodiments, the security layer 115 analyzes incoming messages, meaning messages incoming into the proxy management system 110, to verify that the sender is a known or trusted sender. In some embodiments, secure or encrypted connections over which messages are sent from applications 107 on computing devices to the proxy management system 110 can be established. In such cases, the security layer 115 can analyze the connection to ensure that it is indeed trusted and secure.

In some embodiments, the security layer can analyze the contents of a received message to determine if the message contains credentials that are valid. The security layer 115 can also analyze other or all content in the message to determine the validity of the message in various ways known to those of skill in the art. If the message contains expected data or credentials, the message can be deemed authentic or valid, and thus the security layer 115 allows the message to be passed on to the proxy management system 110 or the cognitive layer 113 for further processing. If a message, sender, and/or communication channel is not successfully authenticated by the security layer 115, the security layer 115 can reject the message, drop or deny the connection request, or can notify a human for human-in-loop processing, in which a human (e.g., manager, supervisor) can authenticate the message, sender, or connection.

Cognitive Layer

Figure 2:
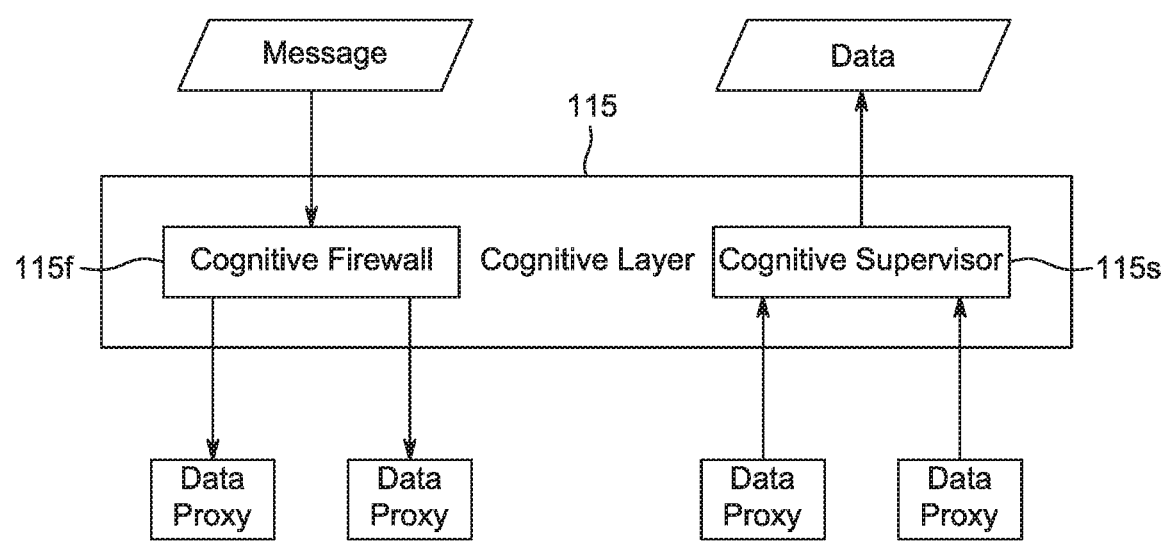
FIG. 2 is a diagram of a one exemplary embodiment of the cognitive layer of the computing environment of FIG. 1.

Still with reference to the exemplary embodiment illustrated in FIG. 1, the proxy management system 110 can include a cognitive layer 113 deployed in the private cloud 117*pv*. The cognitive layer 113 is deployed between the data proxies 105 and the security layer 115. FIG. 2 illustrates a detailed view of the cognitive layer 113. As shown therein, the cognitive layer 113 includes a cognitive firewall 113*f* and a cognitive supervisor 113*s*. Incoming communications from the applications 107 and/or from the security layer 115 are processed by the cognitive firewall 113*f*. The cognitive supervisor 113*s* reviews data received from the sensors of the objects and/or data derived from the data proxies, and outputs information as needed (e.g., to applications 107).

Cognitive Firewall

A message received by the cognitive layer of the proxy management system 110 can be a command, as illustrated in FIG. 2. The incoming command can originate at or be transmitted by one of the applications 107. In some embodiments, the command, sender, or connection over which the command is sent by the application is first authenticated by the security layer 115, as described above, before being sent to the cognitive firewall 113*f*. The command can be, for example, a request for data or an instruction to be executed on or by the object or its data proxy representation.

The cognitive firewall 113*f* analyzes incoming commands to determine whether they would, if executed or processed, have a negative, unwanted, or unexpected consequence, impact, or result. It should be understood that the terms negative, unwanted, or unexpected consequence, impact, or result can be used interchangeably herein to refer to an object's (or its corresponding data proxy's) forward-simulated data or state falling outside or beyond limits deemed to be normal, expected or safe. In some embodiments, these negative impacts can be errors, faults, exceptions, or the like. It should also be understood that, although the cognitive firewall 113*f* is described herein with respect to a command, the message that is processed by the cognitive firewall 113 can be any type of message such as a request (e.g., request for data).

In other words, the cognitive firewall 113*f* predicts potential problems likely to occur if the request or command were indeed executed. In some embodiments, the cognitive firewall 113*f* can predict negative or unwanted impacts on the object by forward simulating the object's future data and states under the assumption that the command is executed. Forward simulation is described in further detail below. Nonetheless, it should be understood that forward simulation includes estimating, using one or more of observers, estimators, probabilistic modeling tools, artificial intelligence, filters, machine learning, and other techniques known to those of skill in the art to predict an object's future states and evolution based on sampled or simulated data from the object (e.g., data proxy), sampled or simulated data from other objects, and/or relevant historic data, which can also be referred to as "supplemental data." In some embodiments, historic data includes information related to the operation of objects (e.g., reference objects, related objects, relevant objects) that can be used to estimate or simulate the operation of another object. For example, the historic data can include data sampled from similar objects, data estimated in relation with similar objects, operational limits, and/or preferences of similar objects learned from monitoring the objects or via machine learning, artificial intelligence, human input, and other such techniques known to those of skill in the art. In some embodiments, operational limits of an object can refer to the upper and lower limits of how that object can operate, including for example maximum and minimum speeds, incoming connections, ports, temperatures, bandwidth, power, and other operational characteristics known to those of skill in the art.

If the cognitive firewall 113*f* determines based on the simulation that the requested command would not have an adverse impact if executed, the cognitive firewall 113*f* executes or authorizes the execution of the command. On the other hand, if the cognitive firewall 113*f* determines based on the forward simulation that the command would negatively impact the object, as described above, the cognitive firewall can take various actions understood by those of skill in the art, such as rejecting the message, triggering human-in-the-loop or machine learning techniques to further determine the potential impact of processing the message, activating alarms, and/or sending notifications as deemed appropriate.

Figure 3:
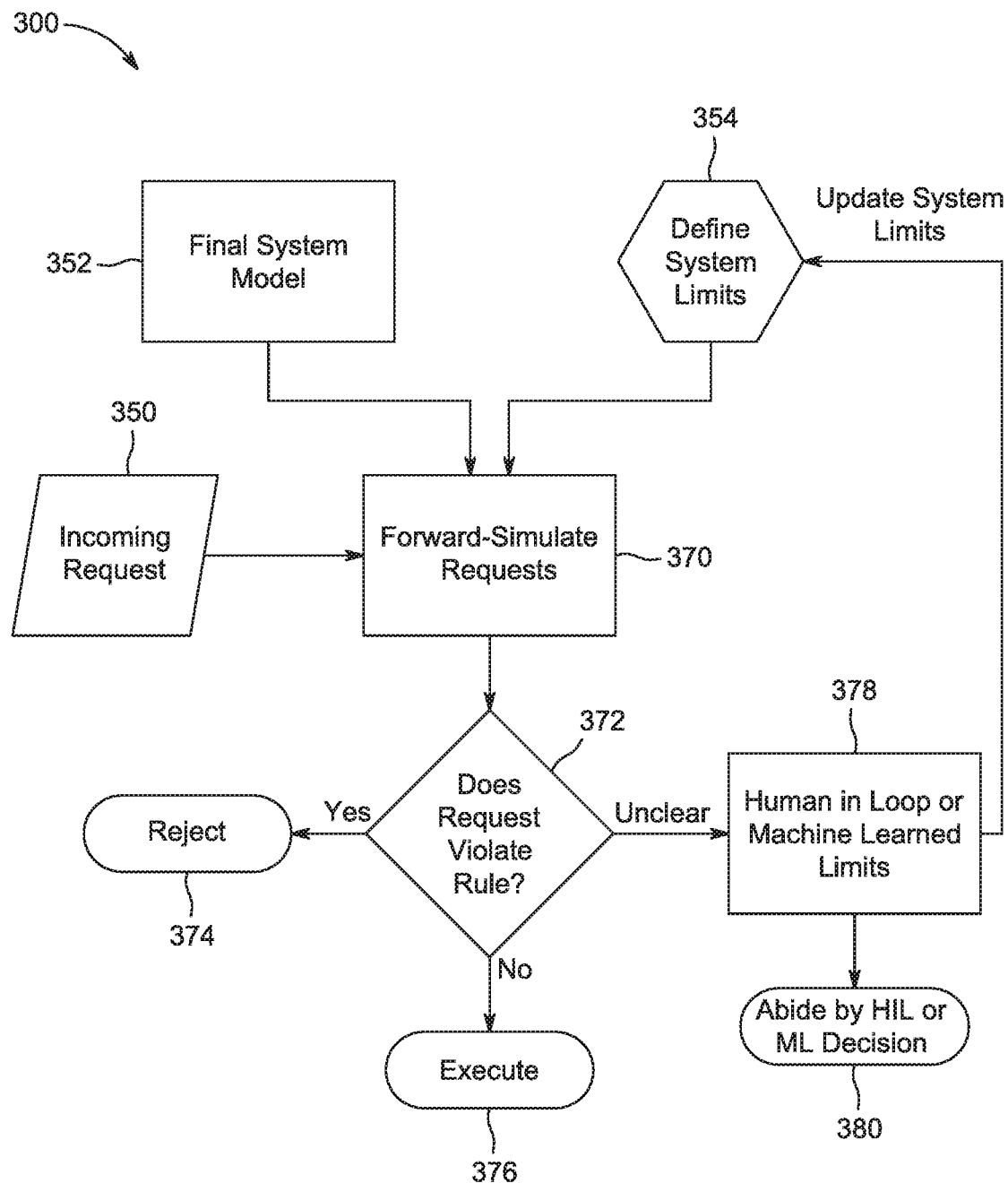
FIG. 3 is a flow diagram of one exemplary embodiment of a process for managing incoming messages using the cognitive firewall of the cognitive layer of FIG. 2.

FIG. 3 is a flow diagram 300 illustrating one exemplary embodiment of a process for managing incoming messages using the cognitive firewall 113*f*. In the exemplary embodiment illustrated in FIG. 3, the incoming message is a request. As shown, the cognitive firewall 113*f* receives an incoming request 350, for example, originating from an application 107 and authenticated by the security layer 115. In some embodiments, the incoming request 350 can be a request to execute a command on, to, or by an object. For instance, the command can be to raise or cause to raise the temperature of an object, such as a tool or machine in a factory, to a desired temperature. In some embodiments, the incoming request 350 can be a request for data corresponding to an object. For instance, the requested data can be data indicating the status of an object. As described in further detail below, a message such as the incoming request 350 can include QoD metrics and/or accuracy and timeliness requirements for data to be used to process the request 350.

One example of fields and data in a data request relating to monitoring vehicle distance traveled include:

```
app_name: Application 1 # unique identifier for application
app_description: Monitors distance traveled by a vehicle
for insurance purposes
    priority: 1 #priority to be considered during processing
    app_needs {
    OBD_freshness_limit_s: 5 # ensure OBD has been updated
within last 5s
    GPS_freshness_limit_s: 15 # ensure GPS has been updated
within last 15s
    max_pos_error_m_r60s: 10 # allow a maximum anticipated
error of 10m at 60s intervals
    max_pos_error_m: 50 # limit maximum error to 50m at any
point in time
    }
    app_wants {
    accel_freshness_limit_s: 5 # attempt to ensure that
accelerometer is updated within last 5s
    threshold_over500m_s: 10 # attempt to update within 10 s
of crossing the d=500m threshold
    }
```

In turn, at step 370, the proxy management system 110 can forward simulate the request 350. Forward simulation refers to a simulation subsequent to a given time period, such as a period subsequent to a current time. The forward simulation can be based, at least in part, on information about the object included in its corresponding model 352, which can include, for example, information related to the sensors of the object. Forward simulation can be based on data sampled from the object, data sampled or simulated from other objects, or historic data related to the manner in which relevant objects operate. Moreover, forward simulating the request 350 allows the proxy management system to estimate data and states of the object at a later time period, based on current or past data. It should be understood that various forward simulation techniques can be applied as known to those of skill in the art.

In some embodiments, the forward simulation can be constrained by limitations of the object. For example, limits can refer to an objects maximum and minimum temperature, a car's maximum velocity, a light's maximum brightness, and any other limit known to those of skill in the art. These limitations are referred to herein as system limits (e.g., FIG. 1, limits 105-A1, 105-B1). In some embodiments, the system limits of an object, such as system limits 354, are stored in the proxy management system in association with the data proxy representing that object. Additionally or alternatively, system limits can be stored in the object itself. The system limits can include those limits provided by the object, such as limits set by the object manufacturer. Additionally or alternatively, the system limits can include limits that are dynamically defined or updated based on data sampled from the object, human-in-the-loop input, and/or machine-learning.

In turn, at step 372, the cognitive firewall 113*f* determines whether the execution of the incoming request would violate rules set or defined by the system limits 354. The step of 372, in other words, filters requests based on rules defined by the system limits, rejecting those that violate rules, and thus potentially cause negative consequences, executing those that do not violate any rules, and further analyzing those requests whose compliance with rules is not readily clear.

For example, if the cognitive firewall 113*f* determines at step 372 that based on the forward simulation of the request, executing the incoming request causes the object violate rules as defined by the system limits 354, the cognitive firewall 113*f* rejects the incoming request at step 374. In some embodiments, when the incoming request is rejected, an alarm can be activated and/or notifications sent to the application that originated the incoming request.

On the other hand, if the cognitive firewall 113*f* determines at step 372 that based on the forward simulation of the request, executing the incoming request does not cause the object to violate rules as defined in the system limits 354, the cognitive firewall 113*f* allows execution of the incoming request at step 376. In some embodiments, executing the incoming request can include controlling the object from the proxy management system 110, or transmitting an instruction to the object to process a command.

In some embodiments, if it is unclear based on the forward simulation performed at step 372 whether executing the incoming request would cause the object to violate rules as defined in the system limits 354, the cognitive firewall 113 can determine a course of action (e.g., whether to execute or reject the request) at step 378 based on one or more of human-in-loop processing or machine learned limits. A course of action based on human-in-loop processing can include determining whether to reject or execute the request based on a human's (e.g., supervisor, manager, owner) input and logic. A course of action based on machine learned limits includes determining whether to reject or execute the request based on continuously updated logic and rules derived from historical data. For example, even if the system limits 354 do not indicate whether the requested action exceeds a system limit, machine learning can analyze historical data of the relevant object (or similar objects) to determine whether the requested action is likely to cause results that were previously deemed to be subpar or unsatisfactory. It should be understood that other machine learning techniques known to those of skill in the art can be used to determine whether or not to execute a request, and/or to set system limits. In some embodiments, the system updates the system limits based on the limits newly learned at step 378 via human or machine learning. In turn, at step 380, the cognitive firewall 113*f* can take the action determined based on the human-in-the-loop processing or machine learned limits.

In some embodiments, a response to the request can be transmitted in turn. One example of fields and data in a response to a data request relating to monitoring vehicle distance traveled includes:

```
proxy_type: model_1, # Provide a (unique) identifier to the
Data Proxy model
mdl_description: Uses Kalman filter to estimate distance
from OBD, GPS, Accelerometer.
data_details {
    req_recv_time = 123456789, # UTC time request received
    req_reply_time = 123456989, # UTC time request replied
to
    OBD_lastseen_s: 3.5, # 3.5s since OBDII last polled
    num_OBD_since_lastreply: 10, # 10 OBD samples since last
reply
    gps_lastseen_s: 9.5, # 9.5s since GPS last polled
    num_GPS_since lastreply: 3 # 3 GPS samples since last
reply
    accel_lastseen_s: 5.5, # 5.5 s since accelerometer last
polled [outside request threshold]
```

```
    num_accel_since_lastreply: 15 # 15 accelerometer samples
since last reply
    pos_error_m_r60s_est: 5.1m, # estimated 5.1 meter error
from model at 60 second check-ins
    pos_error_m_r60s_est_99conf: 2.1m, # estimated accuracy
+-2.1m 99% confidence
    pos_error_m_max_est: 15.1m, # estimated 15.1 meter error
at any point in time
    pos_error_m_max_est_99conf: 4m, # estimated accuracy +-
4m 99% confidence
    threshold_over500m_status: false, # 500m threshold not
crossed yet
    threshold_over500m_status_conf: 95, # 95% likelihood
threshold not crossed at time of reply
}
```

Figure 4A:
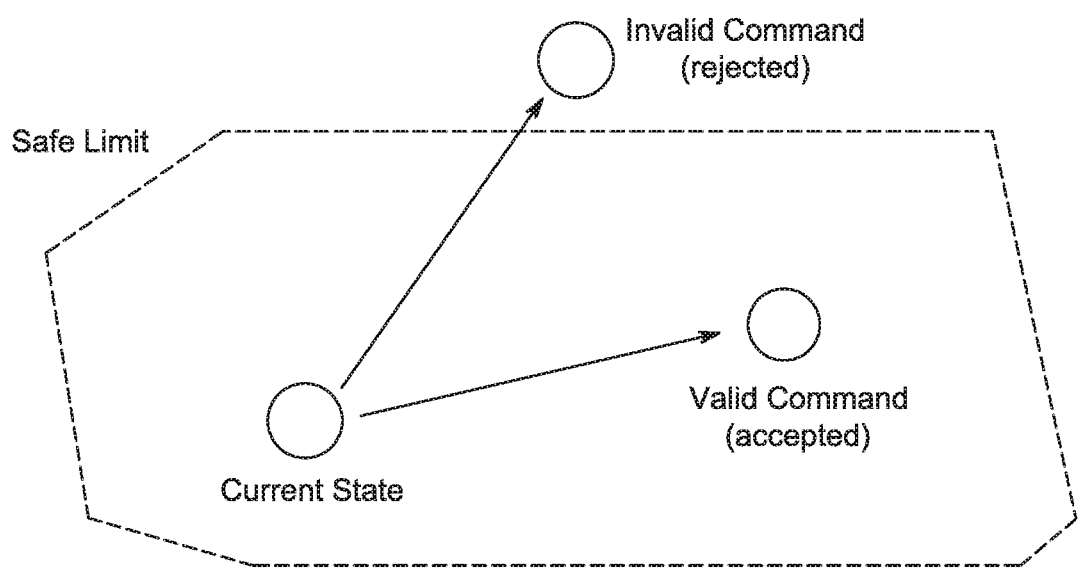
FIG. 4A is an exemplary embodiment of system states plotted relative to system limits as determined using the cognitive layer of FIG. 2.

FIG. 4A illustrates an exemplary application of the process shown in the flow diagram 300 of FIG. 3. As described above, an object's current state can be determined based on data sampled from the object and/or stored in the object's corresponding data proxy. In some embodiments, the current state of an object can refer to the value of one or more parameters associated with the object at a time when the request is made (or approximately near the time that the request is made) or received by the proxy management system. In some embodiments, the current state of an object can be a value obtained from a sensor of the object that indicates, for example, its power (e.g., on, off), temperature, location, speed, etc.

An example of a current state of an object is plotted in FIG. 4A. For example, the current state of an object can be the location and speed of a vehicle object at a first time instance. As shown, the current state is plotted within boundaries that indicate the system limits of the vehicle. States of the vehicle that fall within the boundaries of the system limits determined to be safe limits are deemed to be valid, while states that fall outside of the boundaries are deemed to be invalid.

As described above, the cognitive firewall 113f can receive an incoming request including a command from an application. The cognitive firewall 113f can use the data proxy representing the vehicle object to forward simulate the command, thereby estimating states of the vehicle as if the command were actually executed. As shown in FIG. 4A, estimated system states obtained from forward simulating commands are plotted relative to the boundaries defining the safe limits. If estimated system states resulting from forward simulating a command fall within the boundaries of the system limits, the command is deemed to be valid and is therefore accepted and/or processed (e.g., executed, sent for execution, caused to be executed). On the other hand, if estimated system states resulting from forward simulating a command fall outside of the boundaries of the system limits, the command is deemed to be invalid and is therefore rejected and/or not processed. In some embodiments, the results of the forward simulation and/or a determination of whether to execute or reject the command can be transmitted to the requesting application.

Cognitive Supervisor

The cognitive supervisor 113s of the cognitive layer 113 monitors the objects 103 to determine if they have encountered any problems (e.g., errors, faults, exceptions), including problems occurring on or to the object and/or problems caused by the object.

In some embodiments, the cognitive supervisor 113s can identify actual undesirable states encountered by one of the objects 103. Undesirable states can be identified by comparing actual data sampled from an object against estimated or simulated data.

In some embodiments, the cognitive supervisor 113s monitors an object's true versus anticipated states. The anticipated states are determined by estimating or simulating data. When the objects true behaviors are not as expected, based for example on a comparison against anticipated behaviors, alarms can be activated and/or other forms of notification can be triggered. In some embodiments, the problems that are identified by the cognitive supervisor 113s can include actual problems that have occurred as well as problems that are imminent to occur.

As described above, the proxy management system 110 can estimate data and an object's states based on sampled data. In other words, the proxy management system 110 can predict how an object is expected to behave based on previously acquired data from the object, or historic data from other relevant objects. For example, a simulation can be performed at time t0 to estimate data and/or or predict the state of the object at subsequent times t1, t2 and t3 based on the data sampled prior to time t0. In turn, during or after the occurrence of times t1, t2 and t3, the proxy management system can sample data, from the object, for times t1 to t3. As the sampled data of times t1 to t3 is acquired, or at a time thereafter (e.g., when reporting the sampled data to an application), the cognitive supervisor 113s compares that data against the estimated data obtained from the simulation performed at time t0.

If the cognitive supervisor 113s determines that the actual sampled data does not match (or is not within an allowable error of) the predicted data at a given time or range of time, the cognitive supervisor 113s can output alarms, notifications, or the like indicating that the object has been determined to potentially be malfunctioning or to have malfunctioned. The cognitive supervisor 113s thus allows errors to be addressed or remedied at an early stage.

In some embodiments, when the expected (e.g., estimated) data does not match the actual (e.g., sampled) data, the proxy management system can determine if there is an error occurring, that occurred, or that is expected to occur in the object, its sensors, or its corresponding data proxy, or whether estimated data was inaccurate.

Figure 4B:
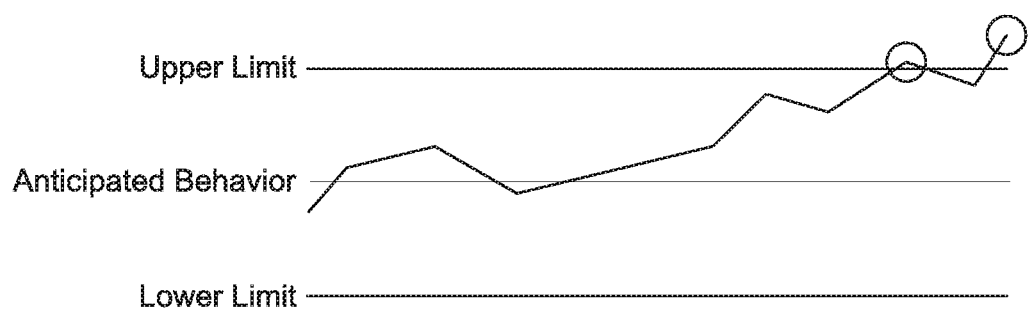
FIG. 4B is a graph illustrating exemplary anticipated object behaviors relative to upper and lower limits as determined using the cognitive layer of FIG. 2.

In some embodiments, system limits of the object, which can include upper and lower limits, can be used during the supervision process of the cognitive supervisor 115s. For instance, as shown in FIG. 4B, the cognitive supervisor can provide alerts or notifications when the object's anticipated behavior (e.g., system states) is approaching a system limit. Such a determination can be achieved by comparing the actually sampled data against the anticipated behavior to verify that they are tracking one another. If so, the cognitive supervisor can conclude that the expected undesirable states are likely to occur.

Data Proxies

As shown in FIG. 1, the proxy management system 110 stores data proxies 105-A and 105-B that correspond to objects 103-A and 103-B, respectively. The data proxies are sets of data that digitally represent physical, real-world objects in the cloud or similar computing environment. The data proxies 103 can be stored in a private cloud 117pv of the proxy management system 110. The data proxies can be associated with corresponding models 105-Am and 105-Bm, and system limits 105-A1 and 105-B1, which are explained in further detail below.

In some embodiments, data proxies are referred to as "replicas," "duplicates," or "mirrors" of the objects that they represent. It should be understood, however, that while data proxies can be duplicates of the object's data, in some embodiments described herein, the data proxies are made up of (1) intermittently measured or sampled data, together with (2) data that are estimated from the sampled data using observers, estimators, or probabilistic modeling tools described in further detail below. The estimated data can be used to fill gaps between the intermittently sampled data.

Object Modeling

To develop the data proxies, the objects that are to be represented by the data proxies are first digitally modeled. The digital models of the objects can be stored in the proxy management system 110 in association with corresponding data proxies. The modeling of objects can occur in response to an object becoming connected or coupled to the proxy management system 110, or at a later time. As known by those of skill in the art, the specific structure, data, and processing defined by the object model can vary and can be selected based on, among other things, the type of object being represented, the objective for generating or maintaining the model, and/or the types of applications that are anticipated or expected to communicate with or rely on the object or its data proxy. In some embodiments, an object can be modeled in different ways in order to achieve different objectives. It should be understood that various statistical and physical models can be implemented as known to those of skill in the art.

The model of an object can include information indicating, among other things, (1) the data needed to estimate the desired object states and other object information, (2) the sensors in the object from which that data is or can be collected, (3) the data acquisition cost to obtain that data, and/or (4) physical and logical attributes of the object. Further, the model of the object can include information indicating (1) the frequency at which the sensors associated with the object are sampled (i.e., the sampling rate) to obtain data, and/or (2) the frequency at which the system states are estimated. In some embodiments, these frequencies can be set to initial baseline values as needed to satisfy initial requirements, and later dynamically recalculated as needed to satisfy evolving or new requirements, as described in further detail below. In some embodiments, the baseline values are set to the maximum sampling rate of each of the objects.

In other words, the data that are to be collected, including the manner in which the data are to be collected and the sensors from which it is to be collected, can be indicated by the model. The set of data that is collected, and data that are calculated and/or estimated based on the collected data, is the data proxy.

Populating Data Proxies

Once objects have been modeled, the data proxies of the objects can be populated as indicated by their respective models. In some embodiments, to populate the data proxies, data are collected from sensors associated with the objects that the data proxies represent. For example, the data proxies 105-A and 105-B are communicatively coupled to corresponding sensors, and include or are made up of data received from those sensors. For instance, the data proxy 105-A is a representation of the object 103-A that comprises the sensor 101-A1. Thus, data generated and/or collected by the sensor 101-A1 can be transmitted to the proxy management system 110 to populate and/or maintain the corresponding data proxy 105-A. Likewise, the data proxy 105-B is a representation of the object 103-B that includes the sensors 101-B1 and 101-B2. Thus, data generated and/or collected by the sensors 101-B1 and 101-B2 can be transmitted to the proxy management system 110 to populate and/or maintain the corresponding data proxy 105-B. It should be understood that new data proxies can be created by and stored in the proxy management system 110 to represent objects or systems not previously represented, or to create different representations of objects or systems otherwise represented.

In some embodiments, a sensor can transmit and receive data, via wired or wireless communications means known by those of skill in the art. For instance, a sensor such as the sensor 101-A1 can transmit data (e.g., sensor data) to its corresponding object 103-A that it is associated with or embedded on. And, in turn, the object 103-A can transmit part or all of that received data to the proxy management system 110 via its wired or wireless communication means. The object 103-A can likewise receive information from the proxy management system 110 and, if needed, transmit the data to the sensor 101-A1.

In some embodiments, sensors such as the sensors 101-B1 and 101-B2 can transmit data to the object 103-B with which they are associated or embedded on, or to the hub 101-B3. The object 103-B, in turn, can transmit part or all of the received data to the proxy management system 110 via its wired or wireless communication means. The object 103-B can likewise receive information from the proxy management system 110 and, if needed, transmit the data to the sensors 101-B1 and/or 101-B2.

In some embodiments, the sensors can communicate directly with the proxy management system 110.

Simulating Data Sets

In addition to including the sampled data, the data proxies can be supplemented with estimated or simulated data. As described above, data are intermittently sampled from an object. For example, data can be sampled at every other time increment, such as t0, t2, t4, and so on. Sampling is performed intermittently, for example, to reduce the cost or burden on resources (e.g., objects, connections, proxy management system) that would be expended by continuously sampling data.

Supplementing the sampled data using estimated data can be referred to as gap filling. Examples of gap-filling techniques include interpolation and estimation. In some embodiments, observer or estimation algorithms, as known to those of skill in the art, can be used to identify estimated system states.

In turn, the data proxies that are populated using sampled data and estimated or filled-in data can continue to be sampled based on dynamically recalculated sampling rates, with data continuing to be filled in using gap filling techniques as described above and known to those of skill in the art.

Dynamic Recalculation of Sampling Rates/Optimizing Sampling Rates

In some embodiments, when an object or system first joins the computing environment 100 or when the object or system is first modeled, data for the corresponding data proxy is collected in accordance with initial default and/or baseline requirements set forth in the model. For example, data can be sampled in accordance with an initial or default baseline frequency that is the maximum sampling rate for each sensor.

Nonetheless, as the computing environment 100 evolves, the sampling rate can be dynamically adjusted or recalculated to ensure that criteria such as scalability and efficiency, are met. In some embodiments, the dynamic recalculation of the sampling rate is event-based. For example, the event that triggers the recalculation of the sampling rate can be applications (e.g., applications 107) joining and leaving the computing environment 100. In other embodiments, the sampling rate is dynamically recalculated based on a schedule (e.g., at regular intervals), using machine learning to identify and anticipate changing requirements, and/or other automated and semi-automated techniques known to those of skill in the art.

Quality of Data (QoD)

The sampling rate for a particular object or system can be dynamically calculated (or recalculated) to meet criteria or requirements such as quality of data (QoD) requirements set by and provided by applications (e.g., applications 107) in the computing environment 100 that are in communication with or communicatively coupled to that particular object. The QoD of the applications indicates the threshold quality that collected data used to populate a data proxy needs to be (or is desired to be), as required by each application communicating with that data proxy and/or with the object or system modeled by that data proxy.

QoD is a metric that is calculated based on elements from quality of service (QoS), quality of experience (QoE), and quality of information (QoI) formulations known to those of skill in the art, including service time, delay, accuracy, load, priority, reliability, efficiency, sensing precision, user experience based on perception, and value of data. In one embodiment, QoD incorporates one or more of these elements into a metric that includes information about or indicates timeliness and/or accuracy requirements. It should be understood that, in some embodiments, the QoD can include metrics about accuracy, truthfulness, completeness, and up to-datedness, or a composite of these, as is described in further detail in Q. Wu et al, "Cognitive internet of things: a new paradigm beyond connection," *IEEE Internet of Things Journal*, vol. 1, no. 2, pp. 129-143 (April 2014), the content of which is incorporated herein by reference in its entirety.

Figure 5:
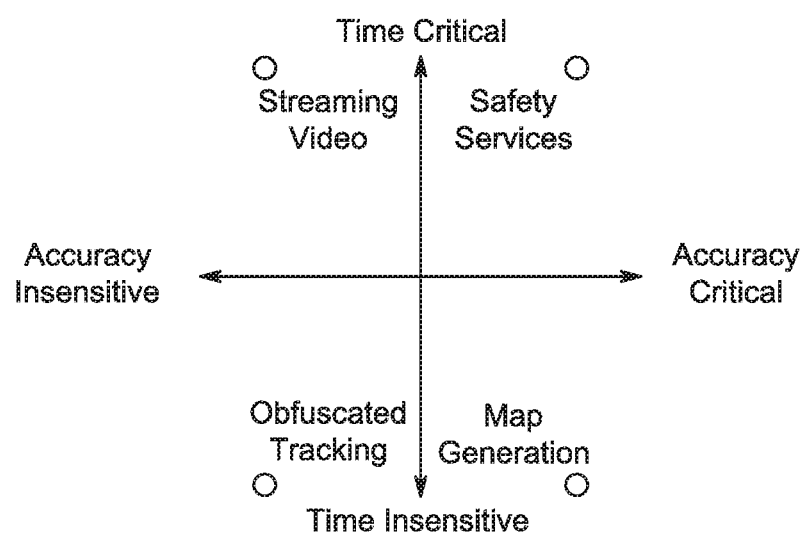
FIG. 5 is an exemplary embodiment of applications plotted based on their respective quality of data metrics.

FIG. 5 is a graph on which QoDs are plotted for various exemplary applications (e.g., safety services, streaming video, obfuscated trafficking, map generation) based on their respective timeliness and accuracy requirements in one exemplary embodiment. As shown with respect to these exemplary applications, the application related to safety services requires sampled data to be timelier than data for the map generation application, and more accurate than data for the streaming video application.

As discussed above, a QoD can be defined in terms of an applications timeliness and accuracy requirements. Non-exhaustive examples of accuracy and timeliness metrics or requirements that can be included in or used to define a QoD include:

a. Instantaneous accuracy: Indicates the allowable error (e.g., amount, percentage) between a type of data in the data proxy corresponding to an object and the data actually generated by the object at a particular time. This metric can be defined in terms of, for example, maximum error and minimum error allowed. One exemplary implementation of maximum error is a case in which a factory manager must know the power used by a machine at a particular moment that another machine might come online. One exemplary implementation of minimum error is in connection with websites that perform tracking and that purposefully must keep locations imprecise.

b. Periodic accuracy: Indicates the allowable error between a type of data in the data proxy corresponding to an object and the data actually generated by the object at regularly spaced intervals. One exemplary implementation of the periodic accuracy metric is in a case where it is necessary to generate snapshot reports to determine trends, such as energy trends, throughout a day.

c. Average accuracy: Indicates the allowable sum of errors between the data in the data proxy corresponding to an object and the data actually generated by the object between two target times. One exemplary implementation of the average accuracy metric is in a case where it is useful to supervise equipment over a long period of time.

d. Maximum latency/freshness: Indicates the acceptable temporal recency of direct sensor measurements, defined in terms of, for example, maximum latency and minimum latency. One exemplary implementation of the maximum latency metric is in maintenance operations for determining when a machine is cool enough to touch. One exemplary implementation of a minimum latency metric is where obfuscated data is preferable, such as when fresh data can present security risks if presented in public-facing websites.

e. Threshold detection: Indicates the acceptable delay between a state being reached and notification being sent to the proxy management system 110. One exemplary implementation of this metric is for temperature monitoring.

Each of the applications can be associated with or determine its QoD and transmit it to the proxy management system 110. In some embodiments, the application agent 111 of the proxy management system aggregates QoD requirements from each of the applications connected or coupled to a particular data proxy or object. The application agent 111 can aggregate or update the applications' QoD requirements in response to receiving a message or request from an application that includes a new or updated QoD.

It should be understood that the QoD can indicate targets or requirements. The proxy management system 110 can therefore provide to applications data that meets the QoD, or can provide data that are as close as possible to meeting the QoD together with confidence intervals, as explained in further detail below. The confidence intervals enable applications to use data that does not meet the QoD to calculate imperfect estimates and measurements. The purpose of the imperfect estimates and measurements are to approximate the data as if the data would have met the QoD requirements.

In some embodiments, an object is sampled at a sampling rate that satisfies its corresponding aggregate QoD, which includes the QoD for the applications coupled to that object. The sampling rate for an object is optimized to reduce resource use. Optimization of the sampling rate can be performed to meet a target cost and/or a target QoD different than the aggregate QoD.

Costs refer to the resource burden of acquiring certain types of data. For example, costs can include bandwidth, battery, and bytes (e.g., power consumption, data transmission, and storage thereof) that are expended by an object, sensor, and/or the proxy management system to acquire a type of data. Cost can also refer to a dollar (or other currency) value needed to obtain certain data. In some embodiments, cost can be measured on a per-sample basis. One example of a cost may be the energy cost to acquire a single sample of data from a GPS device.

The data proxies can be used to forward simulate object data using different sampling rates. The data produced by the forward simulations using different sampling rates can be analyzed to determine the impact of modifying sampling rates on cost and QoD. As described in further detail below, an optimal sampling rate that achieves a desired cost and/or QoD can be selected.

Second Embodiment

Figure 6:
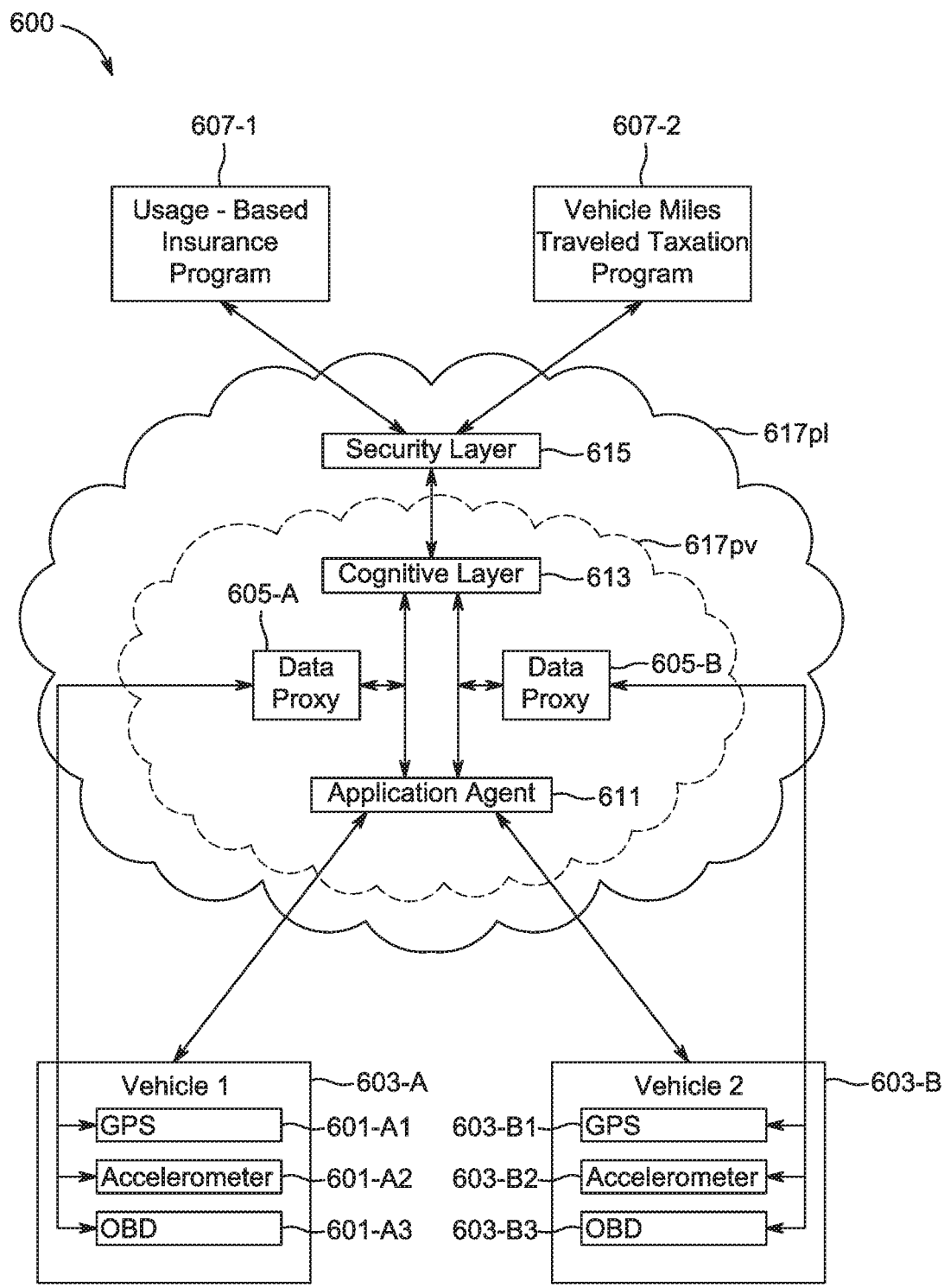
FIG. 6 is a diagram of another exemplary embodiment of a computing environment for managing data proxies, the data proxies in this instance being related to vehicle objects.

FIG. 6 illustrates a computing environment 600 for managing data proxies according to an exemplary embodiment. The computing environment 600 includes a proxy management system 610 that stores and manages data proxies 605-A and 605-B (collectively "605" or "data proxies 605"). The data proxies 605-A and 605-B digitally represent the objects 603-A and 603-B, respectively.

The objects 603-A and 603-B are vehicles that include sensors 601-A1, 601-A2, and 601-A3, and sensors 601-B1, 601-B2, and 601-B3, respectively. The sensors 601-A1 and 601-B1 can be global positioning system (GPS) sensors; the sensors 601-A2 and 601-B2 can be accelerometers; and the sensors 601-A3 and 601-B3 can be vehicle on-board diagnostic (OBD) systems. The GPS sensors 601-A1 and 601-B1 and the accelerometers 601-A2 and 601-B2 can be equipped in a mobile device that is associated with the vehicles 603-A and 603-B. The mobile devices can be associated with the vehicles 603-A and 603-B, for example, if they are owned by the vehicle operators, communicatively coupled (e.g., paired) with the vehicles, and/or positioned within the vehicles. It should be understood, however, that in some embodiments, the GPS and accelerometers are equipped with the vehicles. Likewise, in the illustrated embodiment, the OBD systems 601-A3 and 601-B3 are equipped in the vehicles 603-A and 603-B, respectively.

The computing environment 600 also includes applications 607-1 and 607-2 that are communicatively coupled to the proxy management system 610. The application 607-1 is a usage based insurance (UBI) program for insuring drivers based on different factors such as distance traveled. The application 607-2 is a vehicle miles traveled (VMT) taxation program for taxing drivers based on the use of their vehicles on public roadways. The applications 607-1 and 607-2 can therefore communicate with the proxy management system 610, for example, to obtain information about the vehicles 603-A and 603-B, including their distance traveled, without having to communicate directly with vehicles.

The proxy management system 610 is deployed in a private cloud 617$pv$ that is implemented within a public cloud 617$pl$. As described above with reference to FIG. 1, the configuration of the private cloud 617$pv$ and the public cloud 617$pl$ allows the proxy management system 610 to ensure that communications directed to the private cloud 617$pv$ or components therein are subjected to multiple levels of security.

More specifically, the proxy management system 610 can include a security layer 615 that is deployed in the public cloud 617$pl$. The applications 607-1 and 607-2 can be connected to the proxy management system 610 through the security layer 615. Thus, communications from the applications 607 to the proxy management system 610 can be received and authenticated by the security layer 615. In some embodiments, the security layer 615 employs one or more security techniques such as establishing encrypted communications with each of the applications, and/or authenticating credentials received in each communication. It should be understood that the security layer can implement various other encryption, validation and, authentication techniques known to those of skill in the art.

Messages that are successfully validated or authenticated by the security layer 615 can be transmitted to the cognitive layer 613 of the proxy management system. As explained in further detail below, the cognitive layer 613 can include a cognitive firewall 613$f$ and a cognitive supervisor 613$s$. The cognitive supervisor 615$f$ can verify that incoming messages such as commands are (1) valid, and, (2) if executed, they do not negatively impact the objects 603 and or their respective data proxies 605.

The application agent 611 of the proxy management system 610 can be configured to calculate and optimize sampling rates for each of the objects 603. In some embodiments, the sampling rates for each of the objects 603 can be optimized based, at least in part, on aggregated QoD requirements of each of the respective applications 607 communicatively coupled to the objects 603 and/or data acquisition cost targets.

An exemplary process for developing a data proxy is now described in further detail with reference to data proxy 605-A, which is intended to digitally represent the vehicle 603-A. In some embodiments, the vehicle 603-A can first be modeled. The vehicle 603-A can be modeled in numerous ways known to those skilled in the art and described above in further detail with reference to FIG. 1. The model of the vehicle 603-A can be stored in or by the proxy management system 610, in association with its corresponding data proxy 605-A.

In one embodiment, the proxy management system 610 models the vehicle 603-A based on the vehicle motion model described in Kumar et al., "Integrating On-board Diagnostics Speed Data with Sparse GPS Measurements for Vehicle Trajectory Estimation," SICE Annual Conference, September 2013 (the content of which is incorporated herein by reference in its entirety) in which vehicles are modeled as unicycles constrained to move along a trajectory with no slip. The model is defined such that at least the location and distance traveled by the vehicle 603-A—e.g., system states—can be optimally estimated. In some embodiments, the model corresponding to vehicle 603-A can include or implement various algorithms and other logic (e.g., for estimating, filtering, scaling, bias correcting) known to those of skill in the art, as needed to later obtain required or desired data, and/or calculate the required or desired system states. For instance, as described in Kumar et al. (cited above), the model of the vehicle 603-A can apply a Kalman filter that uses data obtained from sensors of the vehicle 603-B, such as speed and position information, to estimate the vehicle's location and distance traveled.

As known by those of skill in the art, the specific structure, data, and processing defined by or in the model of the vehicle 603-A can vary and can be selected based on, among other things, the type of object being represented, the objective for generating or maintaining the model, and/or the types of applications that are anticipated or expected to communicate with or rely on the object or its data proxy. In some embodiments, an object can be modeled in different ways in order to achieve different objectives.

In some embodiments, the model generated for the vehicle 603-A includes information indicating one or more of: (1) the type of data needed to be sampled from the vehicle 603-A in order to estimate its system states and other system information, (2) the sensors 601-A1 to 601-A3 in the object 603-A from which that data is or can be sampled, and/or (3) the cost required to sample various types of data from the sensors 601-A1 to 601-A3.

Initially, to populate the data proxy 605-A, data are sampled from the vehicle 603-A at a baseline frequency indicated by the model of the vehicle 603-A. In some embodiments, the baseline frequency, which can also be referred to as a sampling rate, indicates the frequency at which the vehicle 603-A is deemed to be fully sampled. Fully sampling the vehicle 603-A means that the sensors 601-A1, 601-A2, and 601-A3 of the vehicle 603-A are sampled at their maximum rate, or at a rate deemed sufficiently high to collect data considered to digitally represent a full set of sensor measurements (e.g., with no gaps). In some embodiments, the proxy management system 610 can calculate and store resource costs (e.g., battery, bandwidth, bytes) expended by fully sampling the sensors 601-A1, 601-A2, and 601-A3.

For instance, the baseline frequency established in the model of the vehicle 603-A can be 10 Hz for each of the sensors 601-A1, 601-A2, and 601-A3. A sampling rate of 10 Hz means that data is sampled from each of the sensors 601-A1, 601-A2, and 601-A3 at a rate of ten times per cycle. It should be understood that a cycle can be defined in various ways based on, by way of non-limiting example, the needs of the vehicle 603-A, and/or the applications 607 coupled thereto. For example, the cycle can be any measure of time (e.g., 1 second, 5 seconds, 10 seconds, 1 minute, etc.) or distance. The sensors 601-A1, 601-A2, and 601-A3 in some embodiments are programmed or configured, in accordance with the model of the vehicle 603-A, to transmit sampled data at the sampling rate of ten times per cycle.

In some embodiments, a Kalman filter can be applied, using the sampled data, to simulate data or states of the vehicle 603-A at future times. In some embodiments, the simulation is a forward simulation. Using the Kalman filter allows the proxy management system 610 to estimate, for example, the location and distance traveled by the vehicle at a desired frequency (e.g., baseline frequency) during a future time period. The proxy management system 610 can continuously forward-simulate states of the vehicle for a future period, and/or can forward-simulate the states of the vehicle based on triggers such as incoming messages. As described above, the forward simulation of the states of the vehicle 603-A can be used by the cognitive layer 615 of the proxy management system 610 to check the safety of incoming commands and to monitor the state of the vehicle 603-A. It should be understood that the forward simulation can be performed using data that are sampled at sampling rates that are dynamically recalculated over time as described in further detail herein.

In some embodiments, the sampling rate at which data is collected by the sensors 601-A1, 601-A2, and 601-A3 of the vehicle 603-A is recalculated in order to satisfy QoD requirements of the applications 607 and/or objectives such as achieving desired costs for acquiring data. In some embodiments, the sampling rate is dynamically recalculated, for example, as applications 607 join and leave the computing environment 600 and/or as the QoD requirements of each of the applications change in response to a request for data, as described in further detail herein.

Dynamic recalculation of the sampling rate is performed, in some embodiments, by the application agent 611 of the proxy management system 610. The application agent 611 aggregates the QoDs of each of the applications 607 coupled to the vehicle 603-A. For instance, in an embodiment in which both the UBI application 607-1 and the VMT taxation application 607-2 are paired with the vehicle 603-A (e.g., the vehicle 603-A participates in both the insurance and taxation programs), the applications 607-1 and 607-2 transmit their respective QoDs to the application agent 611. In some embodiments, the aggregate QoD of the applications 607 indicates a target QoD to be met by the sampled data.

Because sampling the sensors 601-A1, 601-A2, and 601-A3 at the fully sampled frequency can be costly on resources (e.g., vehicle 603, sensors 601), and even at times not feasible over an extended period of time, the application agent can dynamically recalculate the sampling rate to achieve a desired or more feasible cost solution—e.g., a sampling rate that is less burdensome on resources than the cost of a fully sampled sampling rate.

For example, in the present embodiment, the application agent 611 can determine the cost associated with sampling data from the GPS 601-A1, accelerometer 601-A2, and OBD 601-A3. Different costs can be calculated for each type of sensor. It should be understood that cost can be calculated using cost functions known to those of skill in the art. One example of a cost function for calculating a total energy cost for sampling sensors 601-A1, 601-A2, and 601-A3 is as follows:

$$c_{total} = \lambda_{GPS} * n_{GPS} + \lambda_{OBD} * n_{OBD} \qquad (1)$$

In equation (1), $n_{GPS}$ and $n_{OBD}$ represent the number of samples of the GPS 601-A1 and the OBD 601-A3, respectively. The values $\lambda_{GPS}$ and $\lambda_{OBD}$ represent per-sample energy costs for sampling the GPS 601-A1 and the OBD 601-A3, respectively. In one embodiment, it is assumed that $\lambda_{GPS}=10$ μW per sample and $\lambda_{OBD}=3.3$ μW per sample. It should be understood that the equation for calculating total cost can include costs associated with other sensors (e.g., accelerometer 601-A2) and can incorporate costs other than energy, such as bandwidth, bytes, computation, and other costs known by those of skill in the art. In some embodiments, a sensor may be excluded from a total cost equation because its acquisition cost may be so small that its impact on the total cost does not merit or require its inclusion in the equation. For example, because the power required to sample the accelerometer 601-A2 is near-negligible, the accelerometer 601-A2 can be sampled at a maximum rate in models in which energy is the sole cost under consideration.

The proxy management system 610, in turn, attempts to optimize the sampling rate of the sensors 601-A1 to 601-A3 of the vehicle 603-A based on the objective established by the vehicle 603-A, the proxy management system 610, and/or the applications 607. In one embodiment, the objective for optimizing the sampling rate of the sensors 601-A1 to 601-A3 of the vehicle 603-A is to minimize power use while accurately measuring the trajectory and distance that the vehicle 603-A travels.

In some embodiments, the sampling rate is optimized to satisfy an aggregate QoD, which is the aggregate of the QoD requirements of the applications 607 that are communicatively coupled to the vehicle 603-A. As described above, the QoD is a metric that measures errors or amounts of error in process monitoring and event detection.

The proxy management system 610 can forward simulate data sets for the data proxy of the modeled vehicle 603-A using data sampled at various sampling rates (e.g., downsample) and/or having different costs for sampling each of the sensors 601-A1 to 601-A3 to identify an optimal QoD that satisfies the aggregate QoD, as well as constrains such as system limits and target costs. In some embodiments, system limit constraints include a maximum sampling rate for each of the sensors (e.g., 10 Hz) and a minimum sampling period (e.g., 100 s for GPS, 50 s for OBD). The proxy management system 610 can then calculate the QoD of the data of each of the forward simulations, and compare that QoD to the aggregate QoD of the applications 607.

In some embodiments, the QoD of the data from each of the forward simulations can be calculated by the following equation:

$$QoD = m_1(100 - RMSE_{position}) + m_2(100 - MAE_{position}) + m_3(100 - T_{Delay}) \quad (2)$$

In equation (2), $RMSE_{position}$ and $MAE_{position}$ refer to the root mean squared error and the mean average error, respectively, of the position estimates of the forward simulated data relative to the position calculated using sensor data sampled at a fully sampled baseline frequency of 10 Hz. $t_{Delay}$ is the average, absolute value of the delay in detecting a series of threshold crossing events. For example, the delay in detecting a series of threshold crossing events can be when the distance traveled by the vehicle crosses $d = n*500$ m and $n \in \{1, 2, 3, 4, 5\}$. In some embodiments, sampling configurations that result in undefined threshold cross delays can be discarded.

Still with reference to equation (2) above, $m_1$, $m_2$, and $m_3$ are tuning parameters that normalize each error type by its maximum value from a sample set, while providing equal weighting. For example, the tuning constraints $m_1 + m_2 + m_3 = 1$ cause the zero-error case result in a QoD=100. In this case, lower numbers represent increased error relative to the reference estimated position or trajectory.

Optimization Results

An exemplary optimization experiment is now described in further detail. A data proxy was used to maximize data richness and reduce resource use, by optimizing the cost (e.g., for a target QoD) and/or by optimizing the QoD (e.g., for a target cost). Optimal sampling rates were shown to vary with sensor costs and QoD type.

Figure 7A:
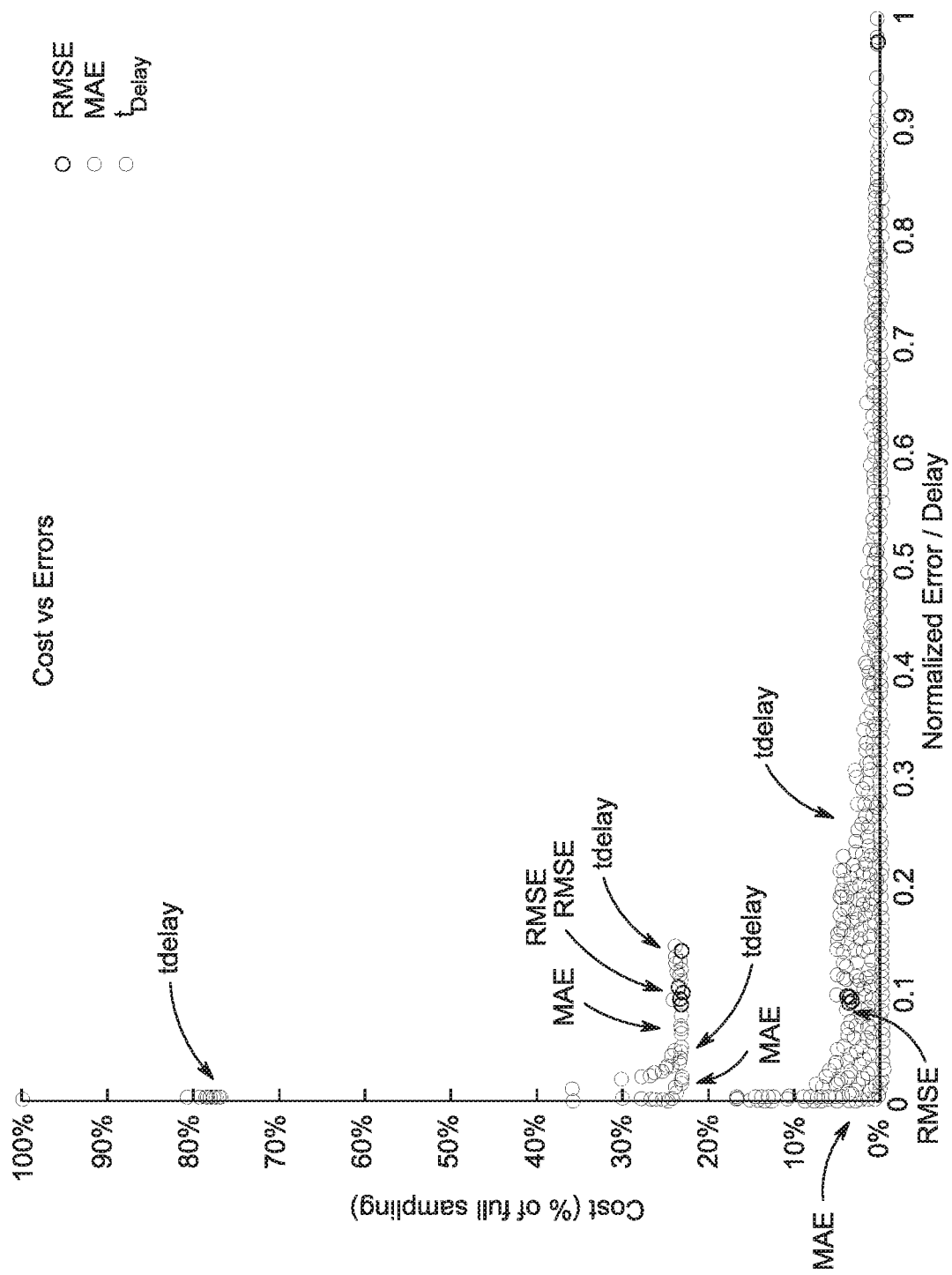
FIG. 7A is a graph illustrating one exemplary embodiment of a comparison between cost and normalized error, in a sampling rate optimization process of the computing environment of FIG. 6.

The QoD varied based on weighting factors and constituent inputs. As shown in FIG. 7A, the normalized error elements RMSE, MAE, and $t_{delay}$ were plotted against cost. These normalized errors approximately followed a 1/x profile. The minimal clustering in FIG. 7A indicates a low error variability for a given cost. Striation, on the other hand, suggests a stronger dependence on certain samples. Thus, it was determined that changing the weight of these errors in the QoD changed the shape and the sampling arrangement.

Figure 7B:
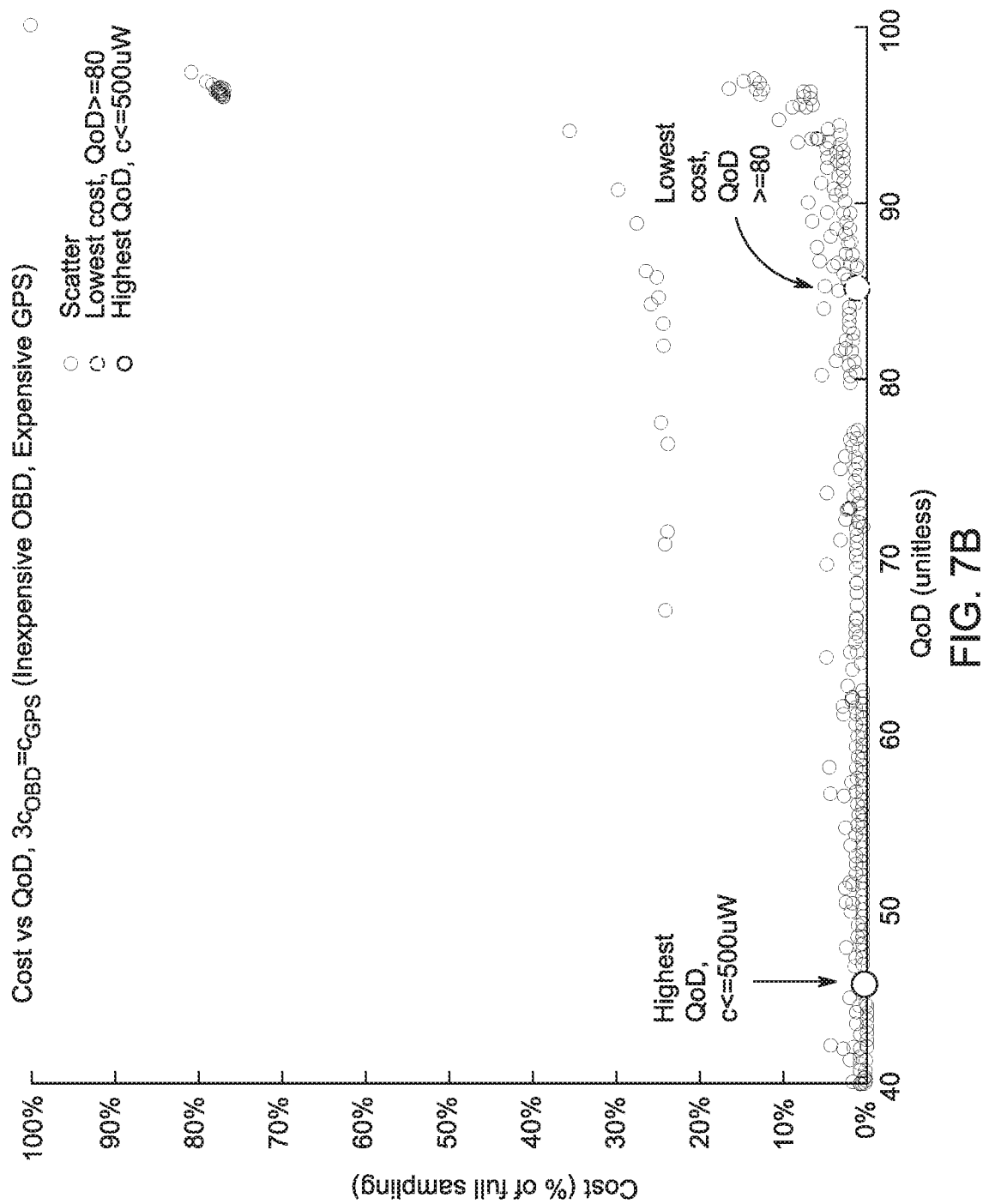
FIG. 7B is a graph illustrating one exemplary embodiment of a comparison between cost and aggregate quality of data metrics, in a low on-board diagnostic system cost sampling rate optimization process of the computing environment of FIG. 6.

The impact of cost on QoD was studied using a base case in which GPS has a high cost of 10 μW per sample, and OBD has an inexpensive cost of 3.3 μW per sample, as shown in FIG. 7B. Moreover, as shown in FIG. 7B, some sampling schemes are not feasible due to high cost or poor QoD. Notably, the steep increase in costs for QoD>=95 illustrates that slight compromises in QoD can lead to significant cost savings. The knee shape in the curve plotted on FIG. 7B indicates that the reference trajectory is significantly oversampled, such that once the estimate is reasonably accurate, additional data offers diminishing returns. In other words, the horizontal portion of the plot offers improved return on sampling. Using simulation-based optimization thus ensures that the optimal cost-benefit relationship can be identified.

Figure 7C:
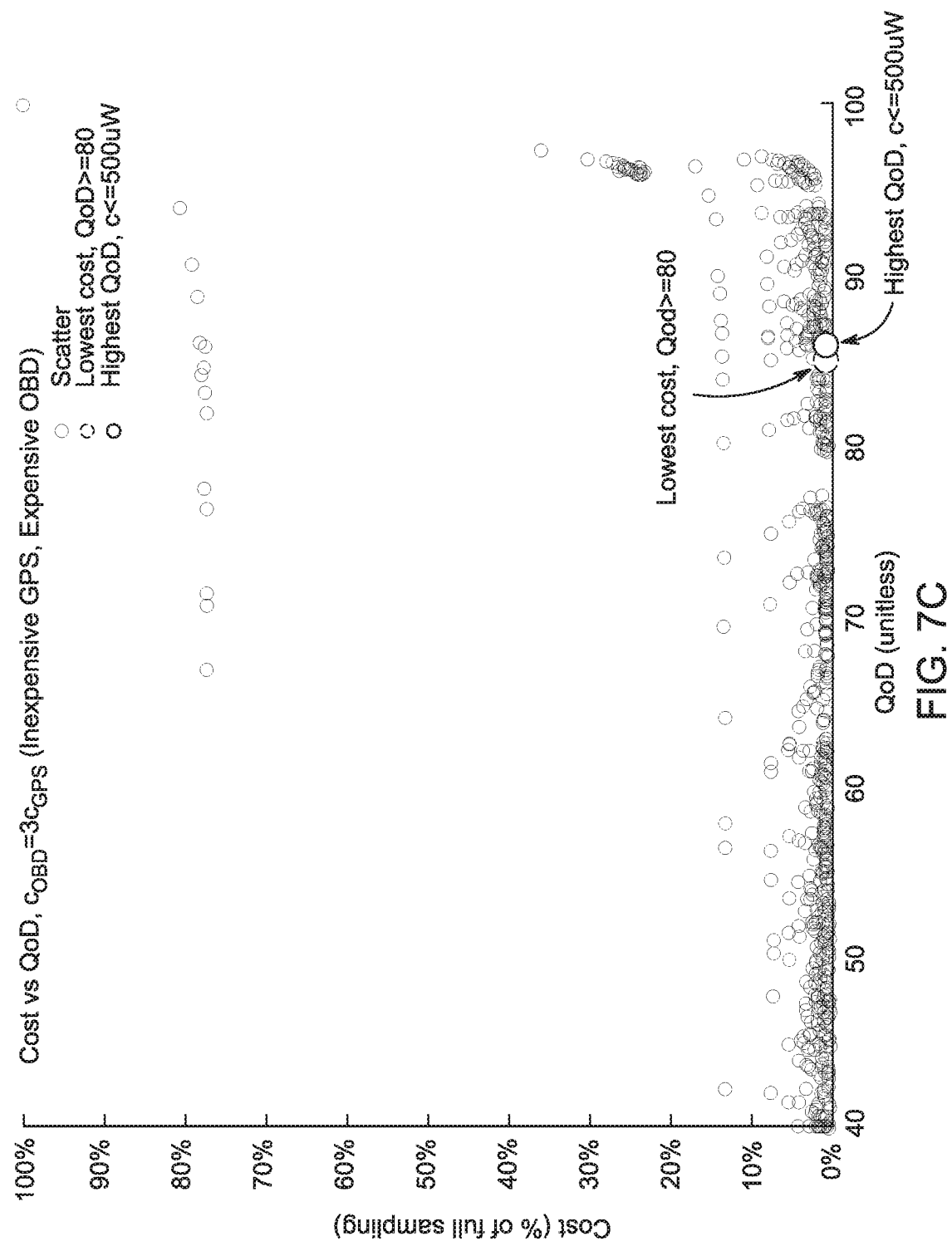
FIG. 7C is a graph illustrating one exemplary embodiment of a comparison between cost and aggregate quality of data metrics, in a high on-board diagnostic system cost sampling rate optimization process of the computing environment of FIG. 6.
Figure 7D:
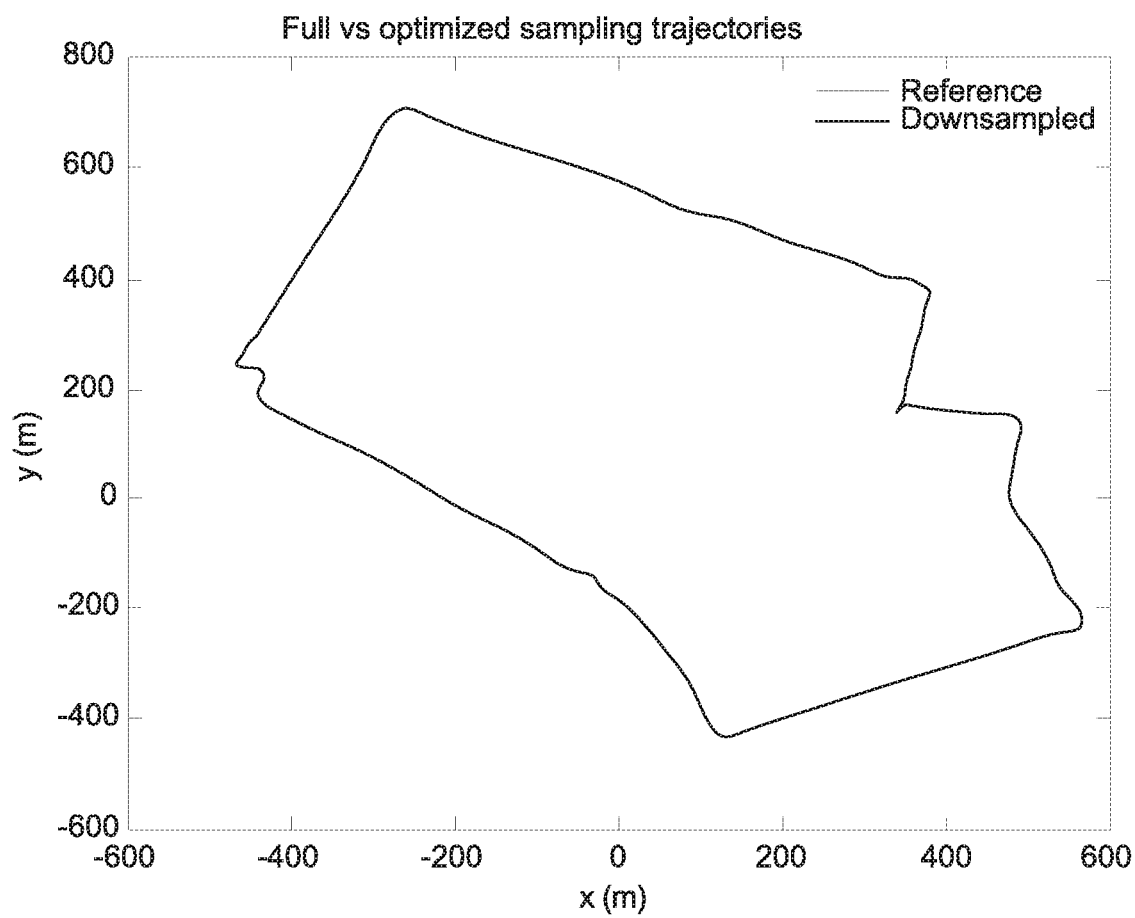
FIG. 7D is a graph illustrating one exemplary embodiment of a comparison between a reference vehicle trajectory and a downsampled estimated trajectory, in a sampling rate optimization process of the computing environment of FIG. 6.

It was determined that using simulated data to determine the optimal return on sampling could dramatically increase battery life with minimal loss in state estimate accuracy. For example, in a case in which GPS has a high cost of 10 μW per sample, accepting a QoD of 95.5 instead of 100 (i.e., zero errors, minimum feasible error of the fully sampled approach) allows the resource expenditure to be reduced by 92.9% relative to full sampling. A comparison of the reference trajectory and the less expensive/costly sampling scheme is illustrated in FIG. 7D.

Another model was forward-simulated with low cost GPS of 3.3 μW per sample and a high cost OBD of 10 μW per sample. FIG. 7C illustrates this cost plotted against aggregate QoD based on this model.

It was determined that, as the costs of each of the sensors change, so does the clustering of the cost and QoD plots. For example, the highest possible QoD for $c_{total} < 500$ μW is QoD=45 in the low-cost OBD case (i.e., OBD cost of 3.3 μW per sample). On the other hand, in the high-cost OBD scenario (i.e., OBD cost of 10 μW per sample), the QoD=86. In the high-cost OBD scenario, the optimal sampling shifts to include more GPS results as acquiring this data is relatively less expensive. To this end, FIG. 7E illustrates the 10 best measured QoDs that meet a constraint of $c_{total} <= 500$ μW for both cost models (high cost OBD, low cost GPS; high cost GPS, low cost OBD).

Figure 7E:
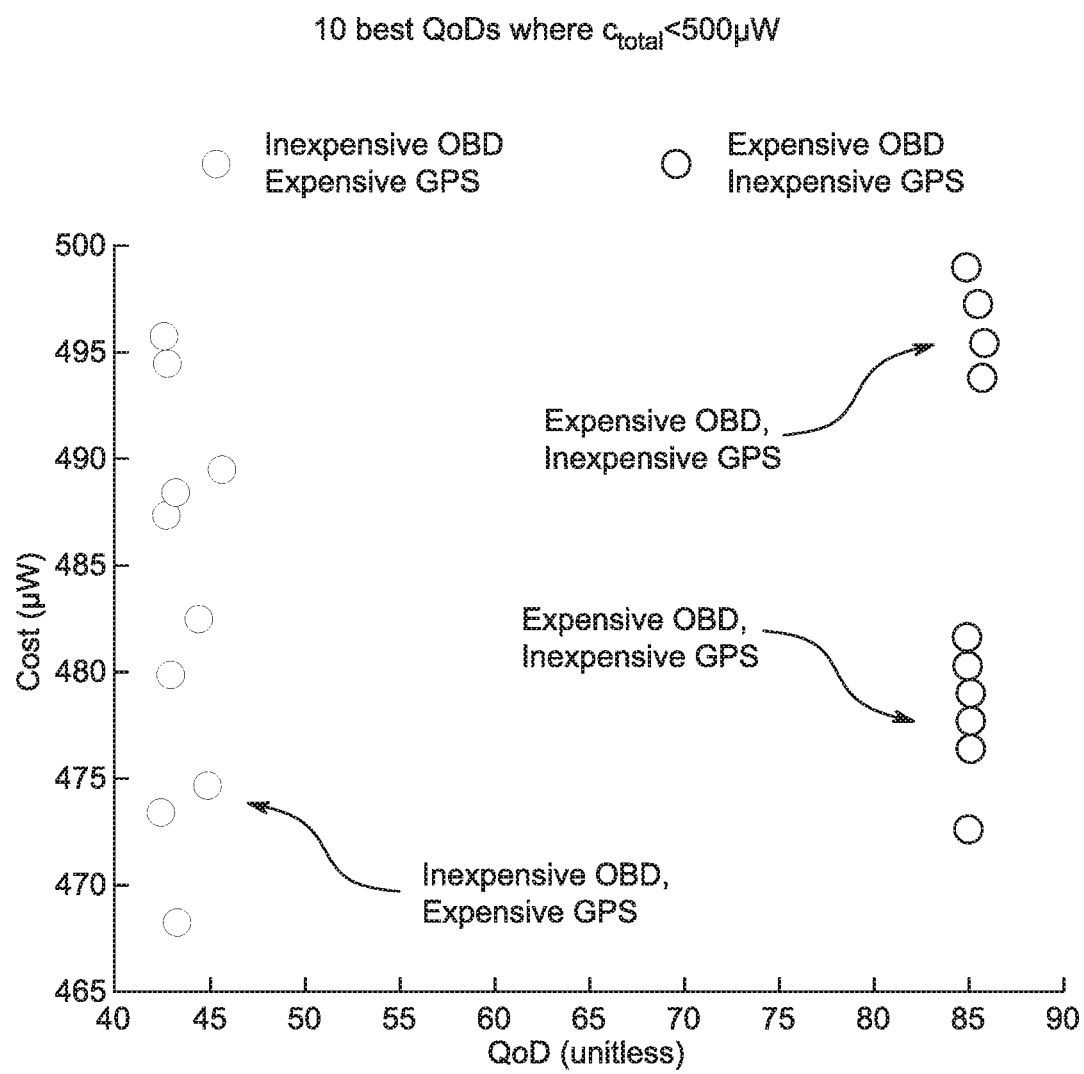
FIG. 7E is a graph illustrating one exemplary embodiment of a comparison of cost and quality of data, in a sampling rate optimization process of the computing environment of FIG. 6.

FIG. 7E further illustrates that increasing the cost of OBD relative to GPS shifts the possibility space to include additional GPS samples, thereby increasing QoD. Also, for a cost target, it can be seen in FIG. 7E that a range of QoDs are possible such that the highest-cost solution is not necessarily the most accurate, for example, because it is a process estimate or forward simulation that is being queried rather than an individual sensor.

Figure 7F:
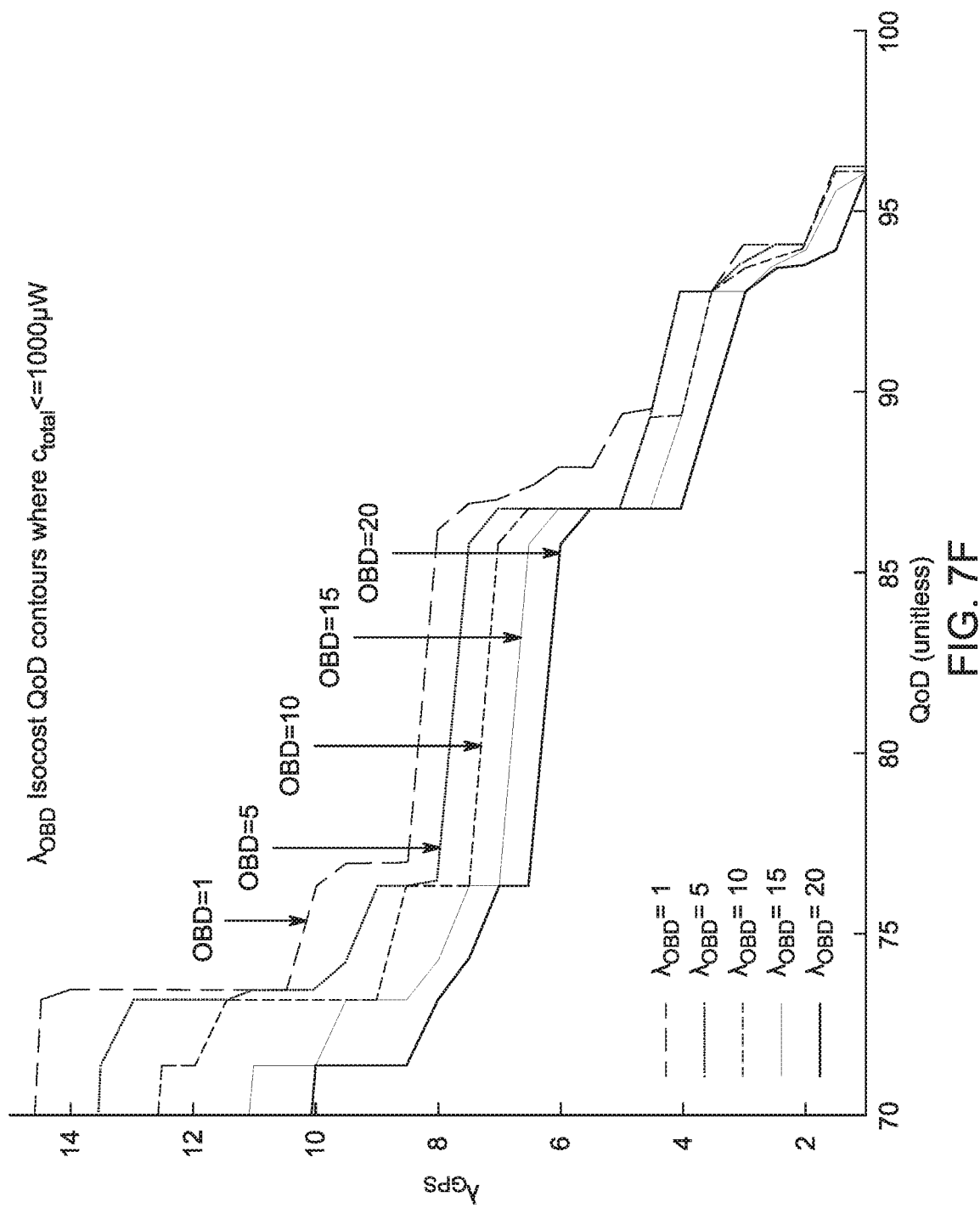
FIG. 7F is a graph illustrating one exemplary embodiment of the impact of global positioning system cost on quality of data, in a sampling rate optimization process of the computing environment of FIG. 6.

The best possible or optimal QoD for a given cost depends on the sampling rate of each sensor, as can be seen from FIG. 7F. FIG. 7F is a contour plot indicating the QoD for differing values of $\lambda_{GPS}$ and $\lambda_{OBD}$ with a maximum allowable cost $c_{total} = 1000$ μW. More specifically, FIG. 7F illustrates constant-OBD-cost curves relating QoD and GPS sampling cost. It can be seen that decreasing GPS cost increases QoD by making direct GPS sampling more feasible. A similar trend can be see with OBD costs, where low-cost sampling leads to increased QoD. Decisions to sample a particular sensor occur at inflection points, thus illustrating the contours to appear like step functions in FIG. 7F. Also, as shown, the curves for low-cost sampling envelop the high-cost sampling curves, demonstrating that the optimization works as intended.

One skilled in the art will appreciate further features and advantages of the disclosure based on the above-described embodiments. Accordingly, the disclosure is not to be limited by what has been particularly shown and described, except as indicated by the appended claims. Additional details related to the present disclosure are described in Siegel, J. "Data proxies, the cognitive layer, and application locality: enablers of cloud-connected vehicles and next-generation internet of things," Massachusetts Institute of Technology (June 2016); Siegel, J., Kumar, S., and Sarma, S., "The Future Internet of Things: Secure, Efficient and Model-Based," (submitted for potential publication in the IEEE Internet of Things Journal, March 2017); and in Siegel, J. and Kumar. S., "Cloud, Context, and Cognition: Paving the Way for Efficient and Secure IoT Implementations," (submitted for potential publication as CPS Cognitive IOT chapter), the contents of which are incorporated herein by reference in their entirety. All publications and references cited herein are expressly incorporated herein by reference in their entirety.

What is claimed is:

1. A system for managing data proxies, comprising:
    at least one memory operable to store one or more data proxies digitally representing, respectively, one or more objects,
    wherein each of the one or more objects include one or more sensors operable to sample data,
    wherein each of the one or more data proxies is generated based on a respective model of the one or more objects, and wherein each of the models includes one or more data acquisition costs associated with each of the one or more sensors;

at least one processor communicatively coupled to the at least one memory, the processor being operable to:
receive first sampled data from the one or more sensors of a first object among the one or more objects, the first sampled data being sampled by the one or more sensors at respective first sampling rates;
populate a first data proxy based on the first sampled data;
simulate at least one data set based on one or more of (i) at least a portion of the first sampled data of the first data proxy, and (ii) supplemental data; and
populate the first data proxy based on the at least one simulated data set,
wherein each of the at least one simulated data sets is simulated at candidate sampling rates,
wherein the at least one processor is further operable to:
determine second sampling rates for each of the one or more sensors, the second sampling rates being selected from among the candidate sampling rates;
receive second sampled data from the one or more sensors of the first object, the second sampled data being sampled by the one or more sensors of the first object at the respective second sampling rates; and
populate the first data proxy based on the second sampled data.

2. The system of claim 1,
wherein the first object is associated with one or more applications, and
wherein the at least one processor is further operable to:
receive a quality of data (QoD) target metric from each of the one or more applications;
calculate an aggregate QoD target metric based on the QoD target metrics received from each of the one or more applications; and
calculate a QoD metric for each of the one or more simulated data sets, and
wherein the second sampling rates are determined based on a comparison of (i) the QoD metric for at least one of the simulated data sets, and (ii) the aggregate QoD target metric.

3. The system of claim 1, wherein the at least one processor to receive the first and second sampled data causes the one or more sensors of the first object to collect the first sampled data and the second sampled data.

4. The system of claim 2, wherein the value of the aggregate QoD target metric is the value of a highest QoD among the QoD target metrics of the one or more applications.

5. The system of claim 2, wherein the QoD target metric of each of the one or more applications, the aggregate QoD target metric, and the QoD for each of the simulated data sets are based on one or more accuracy and timeliness requirements.

6. The system of claim 5, wherein the accuracy and timeliness requirements comprise maximum and minimum errors allowed at a particular time, maximum and minimum errors allowed during regular intervals, maximum and minimum sum of errors allowed between target times, and maximum and minimum time allowed since last sampling.

7. The system of claim 2,
wherein the first sampled data is fully sampled data, and the second sampled data is partially sampled data, and
wherein the at least one processor is further operable to estimate first object data based on the second sampled data, the estimated first object data corresponding to gaps among the second sampled data.

8. The system of claim 2, wherein the first sampling rates, the candidate sampling rates, and the second sampling rates are measured in a uniform or non-uniform number of samples per cycle.

9. The system of claim 2,
wherein the at least one processor is further operable to calculate a total acquisition cost for acquiring each of the simulated data sets, the total acquisition cost being based on the data acquisition cost associated with each of the one or more sensors, and
wherein the determining of the second sampling rates is further based on the total acquisition cost for acquiring each of the at least one simulated data sets.

10. The system of claim 9, wherein the second sampling rates are selected from the candidate sampling rates corresponding to one of the simulated data sets having (i) a total acquisition cost that is lower than or equal to a target acquisition cost, and (ii) a QoD metric closest to the aggregate QoD target metric.

11. The system of claim 9, wherein the second sampling rates are selected from the candidate sampling rates corresponding to one of the simulated data sets having (i) a QoD metric that meets or exceeds the aggregate QoD target metric, and (ii) has a lowest total acquisition cost thereamong.

12. A system for managing data proxies, comprising:
at least one memory operable to store one or more data proxies digitally representing, respectively, one or more objects,
wherein each of the one or more objects include one or more sensors operable to sample data,
wherein each of the one or more data proxies is generated based on a respective model of the one or more objects, and
wherein each of the models includes one or more data acquisition costs associated with each of the one or more sensors;
at least one processor communicatively coupled to the at least one memory, the processor being operable to:
receive first sampled data from the one or more sensors of a first object among the one or more objects, wherein the first object is associated with one or more applications, the first sampled data being sampled by the one or more sensors at respective first sampling rates, wherein the first sampling rates are fully-sampled sampling rates, the fully-sampled sampling rates indicating a maximum rate at which each of the one or more sensors of the first object can be sampled;
populate a first data proxy based on the first sampled data;
simulate at least one data set based on one or more of (i) at least a portion of the first sampled data of the first data proxy, and (ii) supplemental data;
populate the first data proxy based on the at least one simulated data set;
receive a quality of data (QoD) target metric from each of the one or more applications;
calculate an aggregate QoD target metric based on the QoD target metrics received from each of the one or more applications;
calculate second sampling rates for each the one or more sensors of the first object;
receive second sampled data from the one or more sensors of the first object, the second sampled data being sampled by the one or more sensors of the first object at the respective second sampling rates;
estimate first object data based on the second sampled data; and
populate the first data proxy based on the second sampled data and the estimated first object data,
wherein a QoD metric of the combination of the second sampled data and the estimated first object data meets or exceeds the aggregate QoD target metric.

13. The system of claim 12, wherein the supplemental data includes sampled or simulated data from reference objects.

14. The system of claim 12, wherein the simulating of the at least one data set is further based on system constraints defining maximum and minimum operational limits of or associated with the first object or the one or more sensors of a first object.

15. The system of claim 12,
wherein the first sampled data is sampled at a first time instance,
wherein one of the simulated data sets includes estimated first object information estimated based on the first sampled data sampled at the first time instance, and
wherein the at least one processor is further operable to:
receive second sampled data corresponding to a second time instance;
compare the second sampled data to the estimated first object information; and
identify one or more errors based on the comparing of the second sampled data to the estimated first object information.

16. The system of claim 15, wherein the at least one processor is further operable to determine if the one or more errors are errors in the first object or in the second sampled data.

17. The system of claim 12, wherein the simulating of the one or more data sets includes a forward-simulation.

18. The system of claim 12, wherein the processor is further operable to:
receive a first message from a first application communicatively coupled to the first object;
validate the first message; and
simulate one of the data sets further based on the first message.

19. The system of claim 18,
wherein the first message comprises authentication information, and
wherein the validating the first message is based at least in part on the authentication information.

20. The system of claim 18, wherein the at least one processor is further operable to identify one or more potential negative impacts on the first object based on (i) the data set simulated based on the first message, and (ii) system limits associated with the first object.

21. The system of claim 18,
wherein the first message is a command, and
wherein the at least one processor is further operable to execute the command in the first message if one or more potential negative impacts on the first object are not identified, the one or more potential negative impacts being identified based on (i) the data set simulated based on the first message, and (ii) system limits associated with the first object.

22. The system of claim 18,
wherein the first message is a request, the request comprising information indicating requested data and a requested QoD metric including one or more accuracy and timeliness requirements, and
wherein the at least one processor is further operable to transmit a response to the first application including the requested data.

23. The system of claim 22, wherein the response includes a response QoD metric including one or more accuracy and timeliness requirements corresponding to the requested data in the response.

24. The system of claim 23, wherein the response QoD metric includes a confidence interval indicating one or more differences between the requested data in the request and the requested data in the response.

25. The system of claim 24, wherein the one or more differences include a comparison of the requested QoD metric and the response QoD metric.

26. A method for managing data proxies, comprising:
receiving first data related to the operation of one or more objects, wherein the first data comprises first sampled data sampled at a first sampling rate by the one or more sensors of a first object during a first time period, wherein the first sampling rate is a uniform or non-uniform sampling rate that causes the first sampled data to be sampled at intermittent time instances during the first time period, such that non-sampled gaps are created at time periods between the intermittent time instances; and
populating, based on the first data, a first data proxy corresponding to the first object, the first object being interconnected among one or more objects, each of the one or more objects comprising one or more sensors, wherein populating the first data proxy based on the first data comprises:
generating first estimated data based at least on the first sampled data, the first estimated data relating to a time period prior to, during, or after the first time period, and wherein the first estimated data relates to at least the first time period and corresponds to the non-sampled gaps at the time periods between the intermittent time instances; and
populating the first data proxy further based on the first estimated data;
wherein the populating of the first data proxy based on the first sampled data and the first estimated data causes the non-sampled gaps during the first time period to be at least partially populated;
wherein the first data proxy is a digital representation of the first object.

27. The method of claim of claim 26, further comprising:
receiving, from one of a plurality of applications, a first request including first request data;
generating one or more estimated data sets based on the first sampled data and the first request;
determining if the one or more estimated data sets violate any of a first set of rules; and
processing the request according to the determination of the violation of any of the first set of rules.

28. The method of claim 27, wherein the one or more estimated data sets are sampled at different sampling rates.

29. The method of claim 26, wherein the first data comprises one or more of (i) sampled data, (ii) estimated data, and (iii) historic data.

30. The method of claim 26,
wherein the first sampled data is sampled at a first instance, and
wherein the method further comprises:

generating one or more estimated data sets based on the first sampled data sampled at a first time instance, the one or more estimated data sets including first object information for a second time instance;

receiving second sampled data sampled at the second time instance;

comparing the second sampled data to the estimated first object information; and identify one or more errors based on the comparison of the second sampled data to the estimated first object information.

31. The method of claim 26, wherein:

generating first estimated data based at least on the first sampled data comprises generating first estimated data by one of interpolation or estimation.

32. The method of claim 26, further comprising:

identifying one or more of a target QoD metric and/or a target data acquisition cost;

generating one or more estimated data sets at respective candidate sampling rates, the candidate sampling rates being downsampled sampling rates relative to the first sampling rate; and selecting an optimized sampling rate from among the candidate sampling rates based on one or more of the QoD and/or total cost of the estimated data set corresponding to the selected sampling rate.

33. The method of claim 32, wherein the selected optimized sampling rate is the sampling rate that correspond to the estimated data set having (i) a lowest total cost among the one or more estimated data sets having a QoD metric matching or exceeding the target QoD metric, or (ii) a highest QoD among the one or more estimated data sets having a total cost equal to or lower than the target data acquisition cost.

* * * * *